(12) United States Patent
Burtovyy

(10) Patent No.: US 10,675,614 B2
(45) Date of Patent: Jun. 9, 2020

(54) POLYCYCLOOLEFIN MONOMERS AND CATALYST ACTIVATED BY COMPOUND CAPABLE OF GENERATING PHOTOACID AS OPTICAL MATERIALS

(71) Applicant: PROMERUS, LLC, Brecksville, OH (US)

(72) Inventor: Oleksandr Burtovyy, Brecksville, OH (US)

(73) Assignee: PROMERUS, LLC, Brecksville, OH (US)

( * ) Notice: Subject to any disclaimer, the term of this patent is extended or adjusted under 35 U.S.C. 154(b) by 0 days.

(21) Appl. No.: 16/257,137

(22) Filed: Jan. 25, 2019

(65) Prior Publication Data

US 2019/0232267 A1    Aug. 1, 2019

Related U.S. Application Data

(60) Provisional application No. 62/622,162, filed on Jan. 26, 2018.

(51) Int. Cl.

| | | |
|---|---|---|
| *C08F 232/08* | (2006.01) | |
| *C08G 61/08* | (2006.01) | |
| *B01J 31/22* | (2006.01) | |
| *C08K 5/46* | (2006.01) | |
| *C08G 61/12* | (2006.01) | |
| *B01J 31/24* | (2006.01) | |
| *C08L 25/02* | (2006.01) | |
| *H04M 1/725* | (2006.01) | |
| *G06F 3/0488* | (2013.01) | |
| *G06F 3/041* | (2006.01) | |
| *G06F 3/16* | (2006.01) | |

(52) U.S. Cl.
CPC ....... *B01J 31/2273* (2013.01); *B01J 31/2442* (2013.01); *C08F 232/08* (2013.01); *C08G 61/08* (2013.01); *C08G 61/12* (2013.01); *C08K 5/46* (2013.01); *C08L 25/02* (2013.01); *G06F 3/0414* (2013.01); *G06F 3/0488* (2013.01); *G06F 3/165* (2013.01); *H04M 1/72558* (2013.01); *B01J 2231/54* (2013.01); *C08G 2261/122* (2013.01); *C08G 2261/3324* (2013.01); *C08G 2261/418* (2013.01); *C08L 2203/16* (2013.01); *G06F 2203/04104* (2013.01); *H04M 1/7253* (2013.01)

(58) Field of Classification Search
CPC ............................ B01J 31/2278; C08F 232/08
See application file for complete search history.

(56) References Cited

FOREIGN PATENT DOCUMENTS

WO    WO-2016063282 A1 *   4/2016 ............. B33Y 70/00

OTHER PUBLICATIONS

Computer-generated English-language translation of JP2010260916A.*

* cited by examiner

*Primary Examiner* — Vu A Nguyen
(74) *Attorney, Agent, or Firm* — Balaram Gupta

(57) ABSTRACT

Embodiments in accordance with the present invention encompass compositions encompassing a latent catalyst and a compound capable of generating a Bronsted acid along with one or more monomers which undergo ring open metathesis polymerization (ROMP) when said composition is exposed to a suitable radiation to form a substantially transparent film. The monomers employed therein have a range of refractive index from 1.4 to 1.6 and thus these compositions can be tailored to form transparent films of varied refractive indices. The composition of this invention also features low dielectric constant (low k in the range of from about 2.2 to 3). Accordingly, compositions of this invention are useful in various opto-electronic applications, including as coatings, encapsulants, fillers, leveling agents, among others.

19 Claims, No Drawings

POLYCYCLOOLEFIN MONOMERS AND CATALYST ACTIVATED BY COMPOUND CAPABLE OF GENERATING PHOTOACID AS OPTICAL MATERIALS

CROSS REFERENCE TO RELATED APPLICATIONS

This application claims the benefit of U.S. Provisional Application No. 62/622,162 filed Jan. 26, 2018, which is incorporated herein by reference in its entirety.

BACKGROUND OF THE INVENTION

Field of the Invention

Embodiments in accordance with the present invention relate generally to a single component mass polymerizable polycycloolefin monomer(s) and a catalyst which is activated photolytically by a compound capable of generating photoacid. The compositions so formed exhibit high optical transparency and desirable refractive index that match the refractive index of layers in optical devices, such as optical sensors, light emitting diodes (LEDs), organic light emitting diode (OLED), among other devices. More specifically, this invention relates to room temperature stable single component compositions encompassing norbornene (NB) based olefinic monomers and a catalyst which is activated by a compound capable of generating an acid under photolytic conditions thereby undergoing mass polymerization to form transparent optical layers having utility in a variety of opto-electronic applications including as encapsulants, coatings, and fillers.

Description of the Art

Organic light emitting diodes (OLEDs) are gaining importance in a variety of applications, including flat panel televisions and other flexible displays, among other applications. However, conventional OLEDs, particularly, bottom emitting OLEDs suffer from a drawback in that only about half of the generated photons are emitted into the glass substrate out of which 25% are extracted into air. The other half of the photons are wave-guided and dissipated in the OLED stack. This loss of photons is primarily attributed to the refractive index (n) mismatch between the organic layers (n=1.7-1.9) and the glass substrate (n=1.5). By matching the refractive index of the substrate (n=1.8) and organic layers and augmenting the distance of the emission zone to the cathode to suppress plasmonic losses light extraction into the substrate can be increased to 80-90%. See, for example, G. Gaertner et al., Proc. Of SPIE, Vol. 6999, 69992T pp 1-12 (2008).

In addition, OLEDs also pose other challenges; in that OLEDs being organic materials, they are generally sensitive to moisture, oxygen, temperature, and other harsh conditions. Thus, it is imperative that OLEDs are protected from such harsh atmospheric conditions. See for example, U. S. Patent Application Publication No. US2012/0009393 A1.

Furthermore, there is also a need to develop filler organic compositions that exhibit superior insulating properties with a low dielectric constant (low k). Generally, compositions exhibiting a low k in the range of 2.2 to 3.0 are more suitable in the fabrication of OLED devices.

In order to address some of the issues faced by the art, U.S. Pat. No. 8,263,235 discloses use of a light emitting layer formed from at least one organic light emitting material and an aliphatic compound not having an aromatic ring, and a refractive index of the light emitting from 1.4 to 1.6. The aliphatic compounds described therein are generally a variety of polyalkyl ethers, and the like, which are known to be unstable at high temperatures, see for example, Rodriguez et al., I & EC Product Research and Development, Vol. 1, No. 3, 206-210 (1962).

The co-pending U.S. patent application Ser. No. 15/253,980, filed Sep. 1, 2016, discloses a two component mass polymerizable composition which is capable of tailoring to the desirable refractive index and is suitable as a filler and a protective coating material, thus potentially useful in the fabrication of a variety of OLED devices. Although this approach may provide certain advantages it still suffers from the drawback of being two component system. Furthermore, there is also a need for mass polymerizable compositions which are stable at room temperatures as well as OLED fabrication conditions and yet polymerize instantly when subjected to suitable photolytic conditions.

Accordingly, there is still a need for filler materials that complement the refractive index of OLEDs and yet exhibit high transparency, good insulating properties (i.e., low k) and good thermal properties, among other desirable properties. In addition, it is desirable that such organic filler materials readily form a permanent protective coatings and are available as a single component composition for dispensing with such OLED layers.

Thus, it is an object of this invention to provide organic compositions that overcome the gaps faced by the art. More specifically, it is an object of this invention to provide a single component composition that will mass polymerize under the conditions of the fabrications of an OLED device. It is further an object of this invention to provide stable single component mass polymerizable composition with no change in viscosity at or below normal storage conditions but which undergoes mass polymerization only under the process conditions in which the OLED device is finally fabricated, such as for example by the use of radiation.

Other objects and further scope of the applicability of the present invention will become apparent from the detailed description that follows.

SUMMARY OF THE INVENTION

Surprisingly, it has now been found that by employing a single component filler composition, it is now possible to fabricate an OLED device having a transparent optical layer which features hitherto unachievable properties, i.e., refractive index in the range of 1.4 to 1.6 or higher, good insulation properties, i.e., materials with a dielectric constant (k) of less than about 2.5, high colorless optical transparency, desirable film thickness of the filler layer typically in the range of 10 to 20 µm but can be tailored to lower or higher film thickness depending upon the intended application, compatible with the OLED stack, particularly the cathode layer (a very thin layer on the top of the OLED stack), compatible with polymerization of the formulation on the OLED stack, including fast polymerization time and can be photolytically treated at less than 100° C., adhesion to both OLED stack and glass cover, and the like. It is also important to note that the compositions of this invention are expected to exhibit good uniform leveling across the OLED layer which typically requires a low viscosity. Further, compositions of this invention are also expected to exhibit low shrinkage due to their rigid polycycloolefinic structure. In addition, as the components of this invention undergo fast mass polymerization upon application they do not leave behind any fugitive small molecules which can damage the OLED stack. Generally, no other small molecule additives need to be employed thus offering additional advantages. Most importantly, the compositions of this invention are stable (i.e., no change in viscosity) at ambient atmospheric conditions including up to 35° C. for several hours, and undergo mass polymerization only under photolytic conditions. The compositions may further be cured by subjecting to higher than 50° C. and generally the compositions are cured in less than one hour.

Advantageously, the compositions of this invention are also compatible with a "one drop fill" (commonly known as "ODF"). In a typical ODF process, which is commonly used to fabricate a top emission OLED device, a special optical fluid is applied to enhance the transmission of light from the device to the top cover glass, and the fluid is dispensed by an ODF method. Although the method is known as ODF which can be misleading because several drops or lines of material are generally dispensed inside the seal lines. After applying the fluid; the fluid spreads out as the top glass is laminated, analogous to die-attach epoxy. This process is generally carried out under vacuum to prevent air entrapment. The present invention allows for a material of low viscosity which readily and uniformly coats the substrate with rapid flow in a short period of time. The compositions of this invention can also be dispensed by an inkjet process. Even more advantageously, the present invention overcomes the deficiencies faced by the prior art in that a single component composition is much more convenient than employing a two component system especially in an ODF method.

Accordingly, there is provided a single component composition encompassing one or more monomers of formula (I):

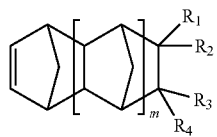
(I)

wherein:

m is an integer 0, 1 or 2;

$R_1$, $R_2$, $R_3$ and $R_4$ are the same or different and each independently selected from the group consisting of hydrogen, halogen, methyl, ethyl, linear or branched ($C_3$-$C_{16}$)alkyl, perfluoro($C_1$-$C_{12}$)alkyl, hydroxy($C_1$-$C_{16}$)alkyl, ($C_3$-$C_{12}$)cycloalkyl, ($C_6$-$C_{12}$)bicycloalkyl, ($CH_2$)$_a$—($C_6$-$C_{12}$)bicycloalkenyl, ($C_7$-$C_{14}$)tricycloalkyl, ($C_6$-$C_{10}$)aryl, ($C_6$-$C_{10}$)aryl($C_1$-$C_6$)alkyl, perfluoro($C_6$-$C_{10}$)aryl, perfluoro($C_6$-$C_{10}$)aryl($C_1$-$C_3$)alkyl, tri($C_1$-$C_6$)alkoxysilyl and a group of formula (A):

—Z-Aryl (A)

wherein:

Z is a bond or a group selected from the group consisting of:
($CR_5R_6$)$_a$, O($CR_5R_6$)$_a$, ($CR_5R_6$)$_a$O, ($CR_5R_6$)$_a$—O—($CR_5R_6$)$_b$, ($CR_5R_6$)$_a$—O—($SiR_5R_6$)$_b$, ($CR_5R_6$)$_a$—(CO)O—($CR_5R_6$)$_b$, ($CR_5R_6$)$_a$—O(CO)—($CR_5R_6$)$_b$ and ($CR_5R_6$)$_a$—(CO)—($CR_5R_6$)$_b$, where a and b are integers which may be the same or different and each independently is 1 to 12, inclusive;

$R_5$ and $R_6$ are the same or different and each independently selected from the group consisting of hydrogen, methyl, ethyl, linear or branched ($C_3$-$C_6$)alkyl, hydroxy, methoxy, ethoxy, linear or branched ($C_3$-$C_6$)alkyloxy, acetoxy, ($C_2$-$C_6$)acyl, hydroxymethyl, hydroxyethyl, linear or branched hydroxy($C_3$-$C_6$) alkyl, substituted or unsubstituted phenyl and substituted or unsubstituted phenoxy;

Aryl is phenyl or phenyl substituted with one or more of groups selected from the group consisting of methyl, ethyl, linear or branched ($C_3$-$C_6$)alkyl, hydroxy, methoxy, ethoxy, linear or branched ($C_3$-$C_6$)alkyloxy, acetoxy, ($C_2$-$C_6$)acyl, hydroxymethyl, hydroxyethyl, linear or branched hydroxy($C_3$-$C_6$)alkyl, phenyl and phenoxy; or one of $R_1$ or $R_2$ taken together with one of $R_3$ or $R_4$ and the carbon atoms to which they are attached to form a ($C_5$-$C_7$)carbocyclic ring optionally containing one or more double bonds;

b) a latent organo-transition metal catalyst comprising a metal selected from the group consisting of ruthenium and osmium; and c) a compound capable of releasing a Bronsted acid when subjected to suitable photolytic conditions; and wherein said monomer of formula (I) is having a refractive index of at least 1.5 and said composition is in a clear liquid form at room temperature.

In another aspect of this invention there is also provided a kit encompassing the composition of this invention for forming a transparent film.

DETAILED DESCRIPTION

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, the symbol "〜〜〜" denotes a position at which the bonding takes place with another repeat unit or another atom or molecule or group or moiety as appropriate with the structure of the group as shown.

As used herein, "hydrocarbyl" refers to a group that contains carbon and hydrogen atoms, non-limiting examples being alkyl, cycloalkyl, aryl, aralkyl, alkaryl, and alkenyl. The term "halohydrocarbyl" refers to a hydrocarbyl group where at least one hydrogen has been replaced by a halogen.

The term perhalocarbyl refers to a hydrocarbyl group where all hydrogens have been replaced by a halogen.

As used herein, the expression "$(C_1-C_6)$alkyl" includes methyl and ethyl groups, and straight-chained or branched propyl, butyl, pentyl and hexyl groups. Particular alkyl groups are methyl, ethyl, n-propyl, isopropyl and tert-butyl. Derived expressions such as "$(C_1-C_4)$alkoxy", "$(C_1-C_4)$thioalkyl" "$(C_1-C_4)$alkoxy$(C_1-C_4)$alkyl", "hydroxy$(C_1-C_4)$alkyl", "$(C_1-C_4)$alkylcarbonyl", "$(C_1-C_4)$alkoxycarbonyl$(C_1-C_4)$alkyl", "$(C_1-C_4)$alkoxycarbonyl", "diphenyl$(C_1-C_4)$alkyl", "phenyl$(C_1-C_4)$alkyl", "phenylcarboxy$(C_1-C_4)$alkyl" and "phenoxy$(C_1-C_4)$alkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "$(C_1-C_6)$perfluoroalkyl" means that all of the hydrogen atoms in said alkyl group are replaced with fluorine atoms. Illustrative examples include trifluoromethyl and pentafluoroethyl, and straight-chained or branched heptafluoropropyl, nonafluorobutyl, undecafluoropentyl and tridecafluorohexyl groups. Derived expression, "$(C_1-C_6)$perfluoroalkoxy", is to be construed accordingly. It should further be noted that certain of the alkyl groups as described herein, such as for example, "$(C_1-C_6)$alkyl" may partially be fluorinated, that is, only portions of the hydrogen atoms in said alkyl group are replaced with fluorine atoms and shall be construed accordingly.

As used herein, the expression "$(C_6-C_{10})$aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "$(C_6-C_{10})$aryl$(C_1-C_4)$alkyl" means that the $(C_6-C_{10})$aryl as defined herein is further attached to $(C_1-C_4)$alkyl as defined herein. Representative examples include benzyl, phenylethyl, 2-phenylpropyl, 1-naphthylmethyl, 2-naphthylmethyl and the like.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of $(C_1-C_6)$alkyl, $(C_2-C_6)$alkenyl, $(C_1-C_6)$perfluoroalkyl, phenyl, hydroxy, —$CO_2H$, an ester, an amide, $(C_1-C_6)$alkoxy, $(C_1-C_6)$thioalkyl and $(C_1-C_6)$perfluoroalkoxy. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

By the term "latent organo-transition metal catalyst" is meant organo-transition metal compounds that show little or no catalytic activity at a particular (usually ambient atmospheric conditions) temperature and initiate such activity upon exposure to suitable radiation.

The term "low k" refers in general to a dielectric constant less than that of thermally formed silicon dioxide (3.9) and when used in reference to a "low-k material" it will be understood to mean a material having a dielectric constant of less than 3.9, but can be in the range as low as 2.2 or generally in the range of from about 2.2 to 3.0.

By the term "derived" is meant that the polymeric repeating units are polymerized (formed) from, for example, polycyclic norbornene-type monomers in accordance with formulae (I) or (IV) wherein the resulting polymers are ring opened metathesis polymerized (ROMP), for example, the 2,3 double bond of norbornene-type monomers are ring opened and polymerized as shown below:

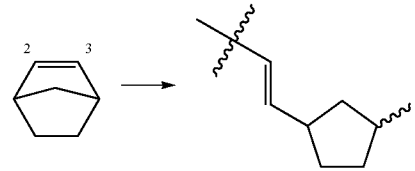

Accordingly, in accordance with the practice of this invention there is provided a single component composition encompassing one or more monomers of formula (I):

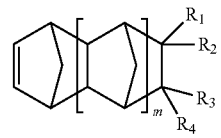

(I)

wherein:

m is an integer 0, 1 or 2;

$R_1$, $R_2$, $R_3$ and $R_4$ are the same or different and each independently selected from the group consisting of hydrogen, halogen, methyl, ethyl, linear or branched $(C_3-C_{16})$alkyl, perfluoro$(C_1-C_{12})$alkyl, hydroxy$(C_1-C_{16})$alkyl, $(C_3-C_{12})$cycloalkyl, $(C_6-C_{12})$bicycloalkyl, $(CH_2)_a$—$(C_6-C_{12})$bicycloalkenyl, $(C_7-C_{14})$tricycloalkyl, $(C_6-C_{10})$aryl, $(C_6-C_{10})$aryl$(C_1-C_6)$alkyl, perfluoro$(C_6-C_{10})$aryl, perfluoro$(C_6-C_{10})$aryl$(C_1-C_3)$alkyl, tri$(C_1-C_6)$alkoxysilyl and a group of formula (A):

—Z-Aryl  (A)

wherein:

Z is a bond or a group selected from the group consisting of:
$(CR_5R_6)_a$, $O(CR_5R_6)_a$, $(CR_5R_6)_aO$, $(CR_5R_6)_a$—O—$(CR_5R_6)_b$, $(CR_5R_6)_a$—O—$(SiR_5R_6)_b$, $(CR_5R_6)_a$—$(CO)O$—$(CR_5R_6)_b$, $(CR_5R_6)_a$—$O(CO)$—$(CR_5R_6)_b$ and $(CR_5R_6)_a$—$(CO)$—$(CR_5R_6)_b$, where a and b are integers which may be the same or different and each independently is 1 to 12, inclusive;

$R_5$ and $R_6$ are the same or different and each independently selected from the group consisting of hydrogen, methyl, ethyl, linear or branched $(C_3-C_6)$alkyl, hydroxy, methoxy, ethoxy, linear or branched $(C_3-C_6)$alkyloxy, acetoxy, $(C_2-C_6)$acyl, hydroxymethyl, hydroxyethyl, linear or branched hydroxy$(C_3-C_6)$alkyl, substituted or unsubstituted phenyl and substituted or unsubstituted phenoxy;

Aryl is phenyl or phenyl substituted with one or more of groups selected from the group consisting of methyl, ethyl, linear or branched $(C_3-C_6)$alkyl, hydroxy, methoxy, ethoxy, linear or branched $(C_3-C_6)$alkyloxy, acetoxy, $(C_2-C_6)$acyl, hydroxymethyl, hydroxyethyl, linear or branched hydroxy$(C_3-C_6)$alkyl, phenyl and phenoxy; or one of $R_1$ or $R_2$ taken together with one of $R_3$ or $R_4$ and the carbon atoms to which they are attached to form a $(C_5-C_7)$carbocyclic ring optionally containing one or more double bonds;

b) a latent organo-transition metal catalyst comprising a metal selected from the group consisting of ruthenium and osmium; and c) a compound capable of releasing a Bronsted acid when subjected to suitable photolytic conditions.

As used herein the Aryl may further include the following:

substituted or unsubstituted biphenyl of formula:

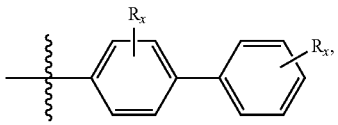

substituted or unsubstituted naphthyl of formula:

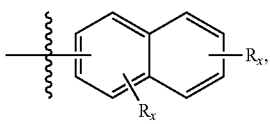

substituted or unsubstituted terphenyl of formula:

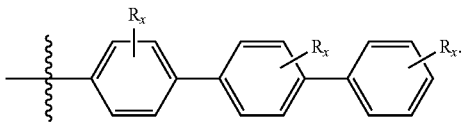

substituted or unsubstituted anthracenyl of formula:

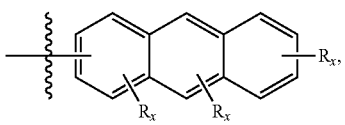

substituted or unsubstituted fluorenyl of formula:

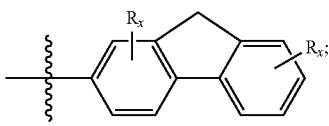

where $R_x$ in each occurrence is independently selected from the group consisting of methyl, ethyl, linear or branched $(C_3-C_{12})$alkyl, $(C_6-C_{10})$aryl, methoxy, ethoxy, linear or branched $(C_3-C_{12})$alkoxy, $(C_6-C_{10})$aryloxy and hydroxy.

As noted, the monomer of formula (I) is having a refractive index of at least 1.5. The composition is in a clear liquid form at room temperature.

The monomers employed in the composition of this invention are themselves known in the literature or can be prepared by any of the known methods in the art to make such or similar types of monomers.

In addition, the monomers as described herein readily undergo mass polymerization, i.e., in their neat form without use of any solvents when mass polymerized under ring open metathesis polymerization (ROMP) conditions using certain transition metal catalysts, such as for example, organo-ruthenium and organo-osmium compounds. See for example, R. H. Grubbs et al., *Handbook of Metathesis*, Ed.: Wiley-VCH, Weinheim, Germany, 2003, R. H. Grubbs et al., *Acc. Chem. Res.* 2001, 34, 18-29, R. H. Grubbs et al., *Angew. Chem. Int. Ed.*, 2006, 45, 3760-3765. Also, see U.S. Pat. No. 6,838,489, pertinent portions of which are incorporated herein by reference. The term "mass polymerization" as used herein shall have the generally accepted meaning in the art. That is, a polymerization reaction that is generally carried out substantially in the absence of a solvent. In some cases, however, a small proportion of solvent is present in the reaction medium. For example, such small amounts of solvent may be used to dissolve the latent catalyst and/or the activator or convey the same to the reaction medium. Also, some solvent may be used to reduce the viscosity of the monomer. The amount of solvent that can be used in the reaction medium may be in the range of 0 to 5 weight percent based on the total weight of the monomers employed. Any of the suitable solvents that dissolves the catalyst, activator and/or monomers can be employed in this invention. Examples of such solvents include alkanes, cycloalkane, toluene, THF, dichloromethane, dichloroethane, and the like.

Advantageously, it has now been found that one or more of the monomers themselves can be used to dissolve the latent catalyst as well as the activator and thus avoiding the need for the use of solvents. In addition, one monomer can itself serve as a solvent for the other monomer and thus eliminating the need for an additional solvent. For example, if first monomer of formula (I) is a solid at room temperature, then the second monomer of formula (I), which is liquid at room temperature can be used as a solvent for the first monomer of formula (I) which is a solid or vice versa. Therefore, in such situations more than one monomer can be employed in the composition of this invention.

Accordingly, it has now been surprisingly found that monomers of formula (I) serve as high refractive index materials imparting high refractive index to the resulting polymeric film upon mass polymerization at a temperature and/or condition different from the application of the composition onto a desirable substrate. In general, the monomers of formula (I) which are suitable in this invention feature a refractive index of at least 1.5. In some embodiments the refractive index of the monomers of formula (I) is higher than 1.5. In some other embodiments the refractive index of the monomers of formula (I) is in the range from about 1.5 to 1.6. In yet some other embodiments the refractive index of the monomers of formula (I) is higher than 1.55, higher than 1.6 or higher than 1.65. In some other embodiments it may even be higher than 1.7.

In general, the composition of this invention exhibits low viscosity, which can be below 50 centipoise (cP) at 25° C. In some embodiments, the viscosity of the composition of this invention is less than 40 centipoise at 25° C. In some other embodiments the viscosity of the composition of this invention is in the range from about 10 to 40 centipoise at 25° C. In yet some other embodiments the viscosity of the composition of this invention is lower than 30 cP, lower than 20 cP, lower than 15 cP, lower than 12 cP at 25° C. In some embodiments it may be lower than 10 cP at 40° C. In some embodiments the viscosity of the composition of this invention is in the range from about 8 to 12 cP at 40° C.

When the composition of this invention contains two or more monomers, for example, they can be present in any desirable amounts that would bring about intended benefit, including either refractive index modification or viscosity modification or both. Accordingly, the molar ratio of first monomer of formula (I) to second distinct monomer of formula (I) can be from 1:99 to 99:1. In some embodiments, the molar ratio of first monomer of formula (I):second distinct monomer of formula (I) is in the range from 5:95 to 95:5; in some other embodiments it is from 10:90 to 90:10; it is from 20:80 to 80:20; it is from 30:70 to 70:30; it is from 60:40 to 40:60; and it is 50:50, and so on. Similarly, when more than two different monomers of formula (I) are employed, any ratios of such monomers can be used that would bring about the intended result.

In general, the compositions in accordance with the present invention encompass the above described one or more of the monomer of formula (I) and if needed additional monomers of formula (I) distinct from each other, as it will be seen below, various composition embodiments are selected to provide properties to such embodiments that are appropriate and desirable for the use for which such embodiments are directed, thus such embodiments are tailorable to a variety of specific applications.

For example, as already discussed above, proper combination of distinctive monomers of formula (I) makes it possible to tailor a composition having the desirable refractive index, viscosity and optical transmission properties. In addition, as described further herein it may be desirable to include other polymeric or monomeric materials, such as for example inorganic nanoparticles which are compatible to provide desirable optical properties depending upon the end use application. Accordingly, the compositions of this invention can also include other high refractive polymeric materials and/or nanoparticles which will bring about such intended benefit. Examples of such polymers include without any limitation, polystyrene, poly(α-methylstyrene), poly (vinyl-toluene), copolymers of co-methylstyrene and vinyl-toluene, and the like. In some embodiments certain of these polymers and/or nanoparticles also function as viscosity modifiers depending upon the type of monomers employed. Accordingly, in some embodiments of this invention polystyrene is used as viscosity modifier.

Advantageously, it has further been found that the compositions of this invention can also contain additional monomers. In some embodiments, the composition according to this invention may further contain one or more second monomer selected from the monomer of formula (IV).

The monomer of formula (IV) is:

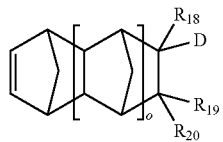

(IV)

wherein:
o is an integer from 0 to 2, inclusive;
D is $SiR_{21}R_{22}R_{23}$ or a group selected from:

—(CH$_2$)$_c$—O—SiR$_{21}$R$_{22}$R$_{23}$      (E);

—(CH$_2$)$_c$—SiR$_{21}$R$_{22}$R$_{23}$      (F); and

—(SiR$_{21}$R$_{22}$)$_c$—O—SiR$_{21}$R$_{22}$R$_{23}$      (G); wherein c is an integer from 1 to 10, inclusive, and where one or more of $CH_2$ is optionally substituted with $(C_1\text{-}C_{10})$alkyl, $(C_1\text{-}C_{10})$perfluoroalkyl or $(C_6\text{-}C_{14})$aryl;

$R_{18}$, $R_{19}$ and $R_{20}$ are the same or different and independently of each other selected from the group consisting of hydrogen, halogen and hydrocarbyl, where hydrocarbyl is selected from the group consisting of methyl, ethyl, linear or branched $(C_3\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl $(C_1\text{-}C_3)$alkyl, $(C_1\text{-}C_{12})$alkoxy, $(C_3\text{-}C_{12})$cycloalkoxy, $(C_6\text{-}C_{12})$bicycloalkoxy, $(C_7\text{-}C_{14})$tricycloalkoxy, $(C_6\text{-}C_{10})$aryloxy$(C_1\text{-}C_3)$alkyl and $(C_6\text{-}C_{10})$aryloxy; and $R_{21}$, $R_{22}$ and $R_{23}$ are each independently of one another selected from the group consisting of methyl, ethyl, linear or branched $(C_3\text{-}C_9)$alkyl, substituted or unsubstituted $(C_6\text{-}C_{14})$aryl, methoxy ethoxy, linear or branched $(C_3\text{-}C_9)$alkoxy and substituted or unsubstituted $(C_6\text{-}C_{14})$aryloxy.

In this aspect of the invention, it has now been found that monomers of formula (IV) provide further advantages. Namely, the monomers of formula (IV) depending upon the nature of the monomer may impart high or low refractive index to the composition, thus it can be tailored to meet the need. In addition, the monomers of formula (IV) generally improve the adhesion properties and thus can be used as "adhesion modifiers." Finally, the monomers of formula (IV) may exhibit low viscosity and good solubility for the latent catalyst and/or activator, among various other advantages.

Accordingly, any of the monomers within the scope of monomer of formula (I) can be employed in the composition of the invention. Representative examples of monomer of formula (I) include the following without any limitations:

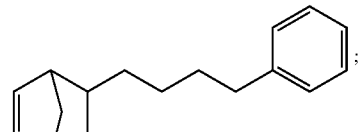

5-(4-phenylbutyl)bicyclo[2.2.1]hept-2-ene

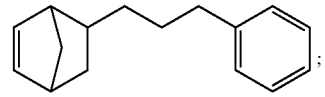

5-(3-phenylpropyl)bicyclo[2.2.1]hept-2-ene

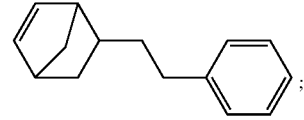

5-phenethylbicyclo[2.2.1]hept-2-ene (PENB)

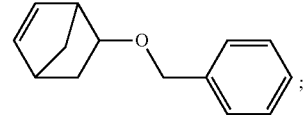

5-(benzyloxy)bicyclo[2.2.1]hept-2-ene

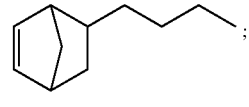

5-butylbicyclo[2.2.1]hept-2-ene (BuNB)

-continued

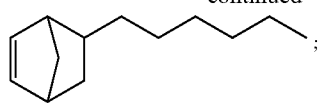

5-hexylbicyclo[2.2.1]hept-2-ene
(HexylNB)

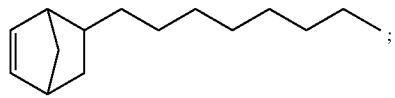

5-octylbicyclo[2.2.1]hept-2-ene (OctNB)

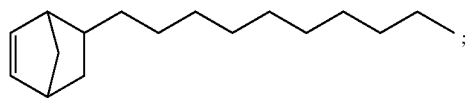

5-decylbicyclo[2.2.1]hept-2-ene (DecNB)

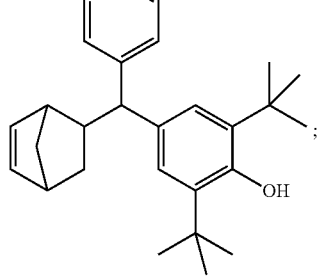

AOAONB

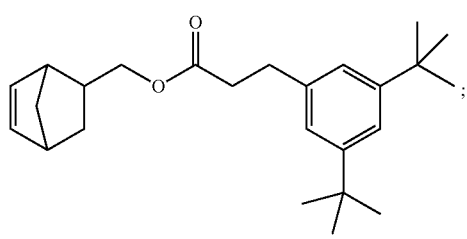

AONB

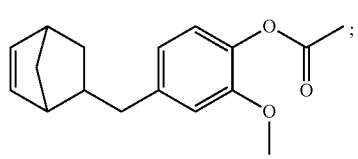

5-norbornenylmethyleugenyl acetate
(EuAcNB)

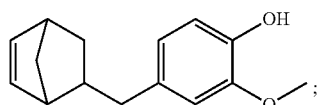

5-norbornenylmethyleugenol
(EuOHNB)

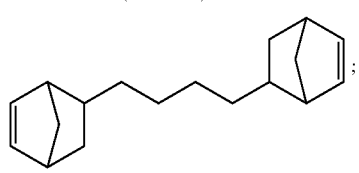

1,4-di(bicyclo[2.2.1]hept-5-en-2-yl)butane
(NBBuNB)

3a,4,7,7a-tetrahydro-1H-4,7-methanoindene
(DCPD)

-continued

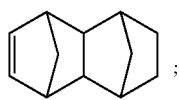

1,2,3,4,4a,5,8,8a-octahydro-1,4:5,8-dimethanonaphthalene
(TD)

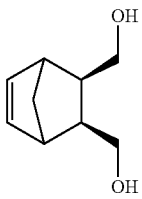

5,6-di(hydroxymethyl)bicyclo[2.2.1]hept-2-ene (NB(MeOH)$_2$)

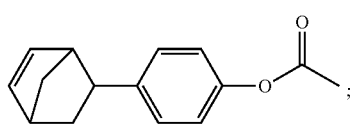

bicyclo[2.2.1]hept-5-en-2-yl-phenyl acetate (PhAcNB)

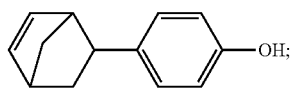

bicyclo[2.2.1]hept-5-en-2-yl-phenol (NBPhOH)

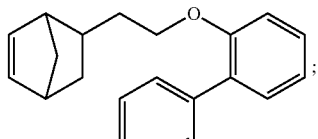

5-(2-([1,1'-biphenyl]-2-yloxy)ethyl)bicyclo[2.2.1]hept-2-ene
(NBEtOPhPh)

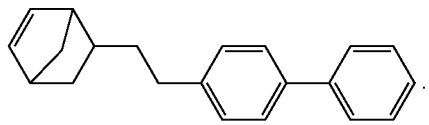

5-(2-([1,1'-biphenyl]-4-yl)ethyl)bicyclo[2.2.1]hept-2-ene (NBEtPhPh)

Representative examples of monomer of formula (IV) include the following without any limitations:

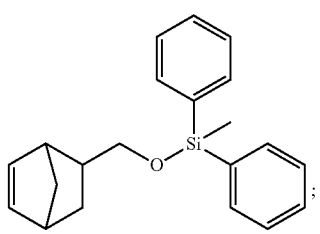

(bicyclo[2.2.1]hept-5-en-2-ylmethoxy)(methyl)diphenylsilane
(NBCH$_2$OSiMePh$_2$)

-continued

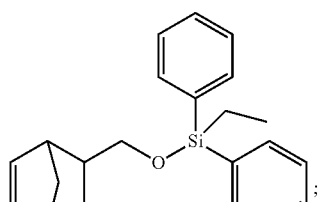
(bicyclo[2.2.1]hept-5-en-2-ylmethoxy)(ethyl)diphenylsilane

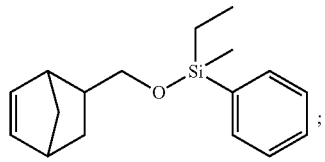
(bicyclo[2.2.1]hept-5-en-2-ylmethoxy)(ethyl)(methyl)(phenyl)silane

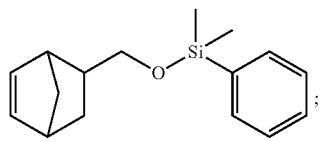
(bicyclo[2.2.1]hept-5-en-2-ylmethoxy)dimethyl(phenyl)silane

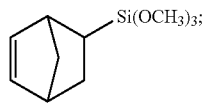
bicyclo-[2.2.1]hept-5-en-2-yltrimethoxysilane (TMSNB)

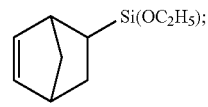
bicyclo-[2.2.1]hept-5-en-2-yltriethoxysilane (NBSi(OC$_2$H$_5$)$_3$

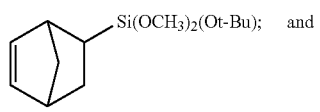
bicyclo-[2.2.1]hept-5-en-2-yl(tert-butoxy)dimethoxysilane

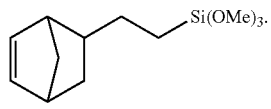
(2-(bicyclo[2.2.1]hept-5-en-2-yl)ethyl)trimethoxysilane

In a further embodiment of this invention, the composition contains any of the latent catalyst that would bring about the mass polymerization as described herein under ROMP conditions. Generally, such suitable latent catalysts include a number of known organo-transition metal complexes, such as organo-ruthenium or organo-osmium compounds, among others.

Accordingly, the composition of this invention encompasses a latent catalyst which is an organo-ruthenium compound selected from the group consisting of a compound of formula (IIA), a compound of formula (IIB), a compound of formula (IIIA), a compound of formula (IIIB) and a compound of formula (IIIC):

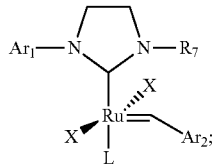
(IIA)

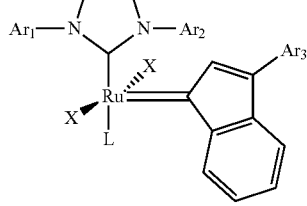
(IIB)

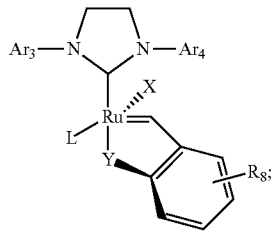
(IIIA)

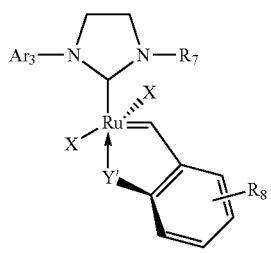
(IIIB)

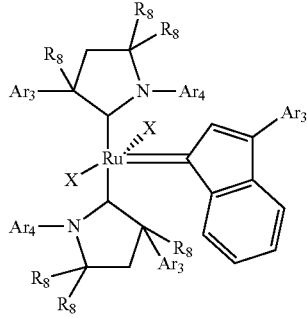
(IIIC)

and
wherein:

X is selected from the group consisting of chlorine, bromine, iodine, —OR$_a$, —O(CO)R$_a$ and —OSO$_2$R$_a$, where R$_a$ is selected from the group consisting of (C$_1$-C$_{12}$)alkyl, (C$_3$-C$_{12}$)cycloalkyl and (C$_6$-C$_{14}$)aryl;

Y is selected from the group consisting of O, S and NCOCF$_3$;

Y' is selected from the group consisting of OR$_9$, SR$_9$ and —N=CHC(O)O(C$_1$-C$_6$)alkyl, where R$_9$ is selected from the group consisting of methyl, ethyl, linear or branched (C$_1$-C$_6$)alkyl, (C$_6$-C$_{10}$)aryl, methoxy, ethoxy, linear or branched (C$_1$-C$_6$)alkoxy, (C$_6$-C$_{10}$)aryloxy and —OCH(CH$_3$)C(O)N(CH$_3$)(OCH$_3$);

L is selected from the group consisting of pyridine, PR$_3$ or O=PR$_3$, where each R is independently selected from the group consisting of isopropyl, sec-butyl, tert-butyl, cyclohexyl, bicyclo($C_5$-$C_{10}$)alkyl, phenyl, benzyl, isopropoxy, sec-butoxy, tert-butoxy, cyclohexyloxy, phenoxy and benzyloxy;

$R_7$ is selected from the group consisting of isopropyl, sec-butyl, tert-butyl, substituted or unsubstituted cyclohexyl, substituted or unsubstituted phenyl, substituted or unsubstituted biphenyl and substituted or unsubstituted naphthyl;

$R_8$ is selected from the group consisting of chlorine, methyl, ethyl, linear or branched ($C_1$-$C_6$)alkyl, ($C_6$-$C_{10}$)aryl, methoxy, ethoxy, linear or branched ($C_1$-$C_6$)alkoxy, ($C_6$-$C_{10}$)aryloxy, —NHCO($C_1$-$C_6$)alkyl, —NHCO-perfluoro($C_1$-$C_6$)alkyl, —$SO_2$N(($C_1$-$C_6$)alkyl)$_2$ and —$NO_2$;

$Ar_1$, $Ar_2$ $Ar_3$ and $Ar_4$ are the same or different and each independently selected from the group consisting of substituted or unsubstituted phenyl, substituted or unsubstituted biphenyl and substituted or unsubstituted naphthyl;

wherein said substituents are selected from the group consisting of methyl, ethyl, iso-propyl, tert-butyl, phenyl and OSi(SiMe$_3$)$_3$, where Me is methyl.

Generally, any of the latent organo-transition metal catalyst that would bring about ring open metathesis polymerization of the monomers of formula (I) can be employed in the composition of this invention. More specifically, organo-ruthenium or organo-osmium compounds that show little or no activity at ambient temperatures can be employed. That is, the latent catalysts that are stable at or near room temperature are more suitable in the composition of this invention. The latent catalysts may be activated by a variety of conditions, including without any limitation thermal, acid, light and chemical activation. The chemical activation may include use of thermal acid generator or photo acid generators.

Another approach of rendering ROMP catalyst dormant is by deactivating the catalyst by addition of suitable deactivating agent, such as for example, photo base generator. The catalyst is reactivated again by the use of thermal acid generator or photo acid generator. Another approach in tuning the latency of a ROMP catalyst is by way of manipulating the N-heterocyclic carbene (NHC) ligand as further exemplified below. Accordingly, various different techniques as described herein can be employed to render the catalyst latent which can be activated later either photolytically or by thermal treatment or by chemical activation so as to facilitate fabrication of electronic devices as described herein.

Several of the latent catalysts that are suitable to be employed in the compositions of this invention are known in the literature or can be readily made by any of the known procedures in the art. See for example, Grubbs, et al., Organometallics, 2011, 30 (24): 6713-6717; Sutar et al., Angew. Chem. Int. Ed. 2016, 55, 764-767; Leitgeh, et al., Monatsh Chem (2014) 145:1513-1517; van Hensbergen, et al., J. Mater. Chem. C. 2015, 3, 693-702; Grubbs, et al., J. Am. Chem. Soc., 2009, 131, 203802039; Zak, et al., Eur. J. Inorg. Chem., 2014, 1131-1136; Gawin, et al., ACS Catal. 2017, 7, 5443-5449. Further examples of such catalysts can also be found in U.S. Pat. No. 9,328,132, pertinent portions of which are incorporated herein by reference. Accordingly, a few of the exemplary latent catalysts, which are organo-ruthenium compounds, without any limitation maybe selected from the group consisting of:

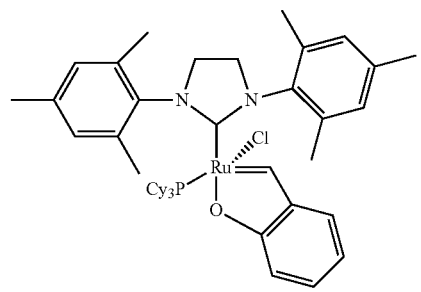

1,3-bis(2,4,6-trimethylphenylimidazolidin-2-ylidene)(tricyclohexylphosphine)-(2-oxobenzylidene)ruthenium(VI) chloride;

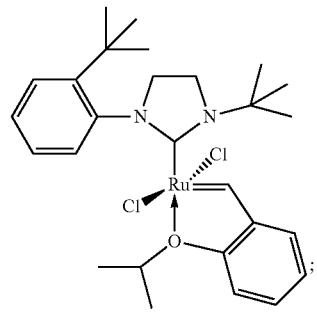

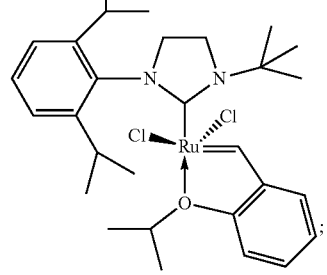

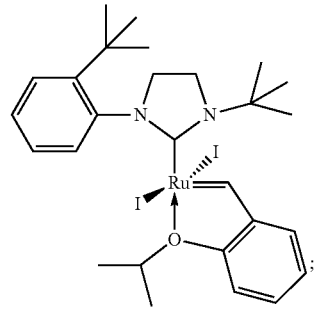

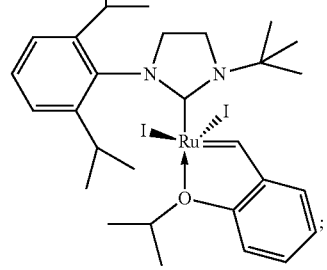

-continued

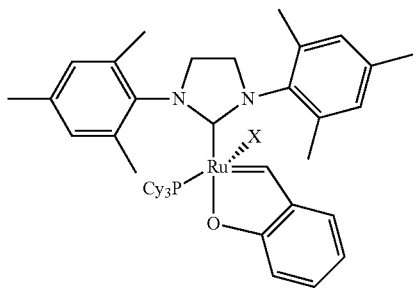

where Cy is cyclohexyl and X is selected from the group consisting of halogen, —OR$_a$, —O(CO)R$_a$ and —OSO$_2$R$_a$, where R$_a$ is selected from the group consisting of (C$_1$-C$_{12}$)alkyl, (C$_3$-C$_{12}$)cycloalkyl and (C$_6$-C$_{14}$)aryl; see, for example, U.S. Pat. No. 9,328,132, for example, when X=I, the compound is of the formula:

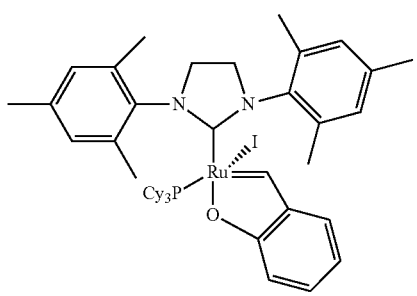

1,3-bis(2,4,6-trimethylphenylimidazolidin-2-ylidene)(tricyclohexylphosphine)-(2-oxobenzylidene)ruthenium(VI) iodide;

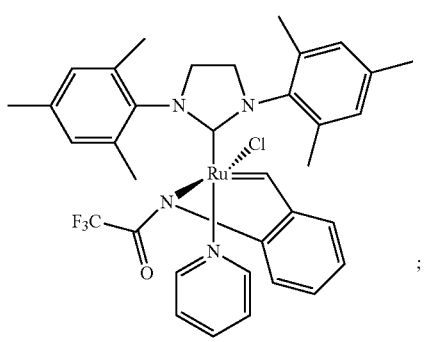

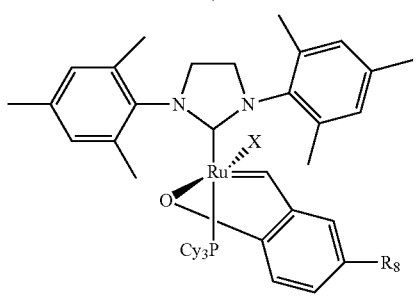

where Cy is cyclohexyl, X is Cl or I and R$_8$ is hydrogen, NO$_2$ or C$_1$;

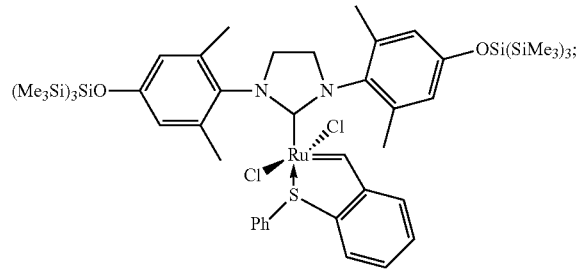

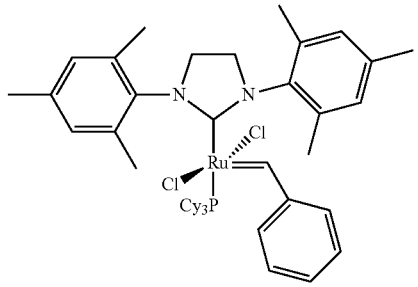

Where Cy is cyclohexyl;

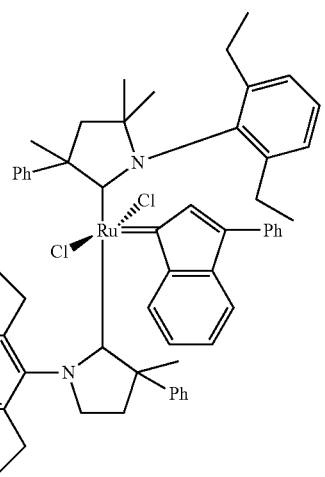

bis-[1-(2,6-diethylphenyl)-3-phenyl-3-methyl-5,5'-dimethyl-2-imidazolidinylidene]dichloro(3-phenyl-1H-inden-1-ylidene) ruthenium;

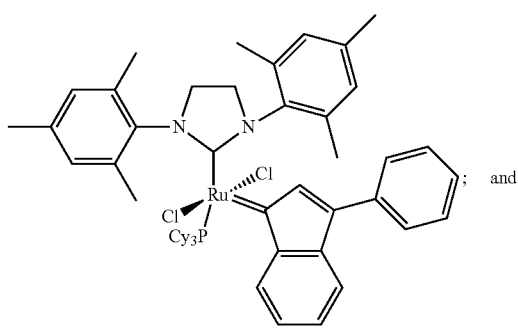

; and

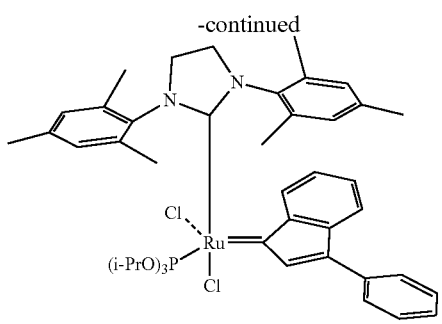

cis-[1,3-bis(2,4,6-trimethylphenyl)-2-imidazolidinylidene]
dichloro(3-phenyl-1H-inden-1-ylidene)(triisopropylphosphite)ruthenium(II), commercially available from Umicore.

Various other organoruthenium compounds which are dormant under ambient conditions and can be activated photolytically can also be used in the composition of this invention. One such example without any limitation include the following:

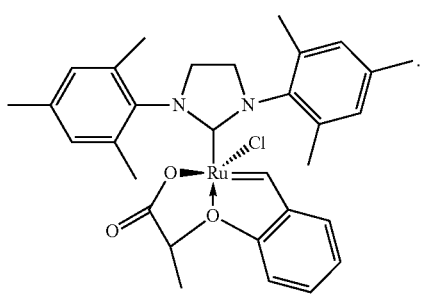

As noted, the composition of this invention further contains a compound capable of releasing a Bronsted acid when subjected to suitable photolytic conditions. Surprisingly it has now been found that certain of the known photoactive active compounds, such as for example, a class of substituted xanthone derivatives can be used for this purpose.

Accordingly, in some embodiments such xanthone derivatives are of the formula (V):

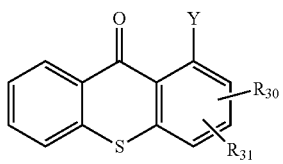

Wherein Y is halogen; and $R_{30}$ and $R_{31}$ are the same or different and independently of each other selected from the group consisting of hydrogen, methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl $(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$ aryloxy$(C_1-C_3)$alkyl and $(C_6-C_{10})$-aryloxy. In some embodiments Y is selected from the group consisting of fluorine, chlorine, bromine and iodine. In some other embodiments Y is chlorine. In some other embodiments $R_{30}$ is hydrogen and $R_{31}$ is selected from the group consisting of methoxy, ethoxy, n-propoxy, iso-propoxy, butoxy, and the like.

Representative examples of the compounds of formula (V) may be listed as follows:

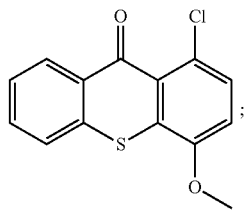

1-chloro-4-methoxy-9H-thioxanthen-9-one

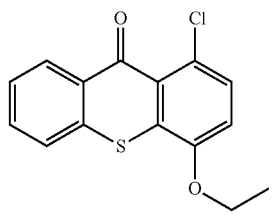

1-chloro-4-ethoxy-9H-thioxanthen-9-one

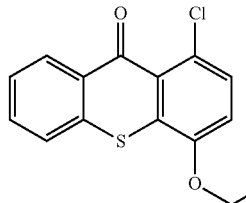

1-chloro-4-propoxy-9H-thioxanthen-9-one
(commercially sold under the name CPTX from Lambson)

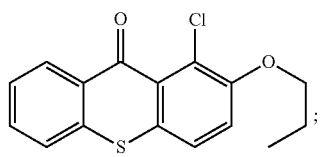

1-chloro-2-propoxy-9H-thioxanthen-9-one

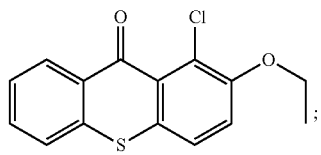

1-chloro-2-ethoxy-9H-thioxanthen-9-one

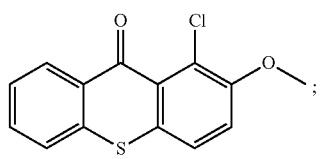

1-chloro-2-methoxy-9H-thioxanthen-9-one

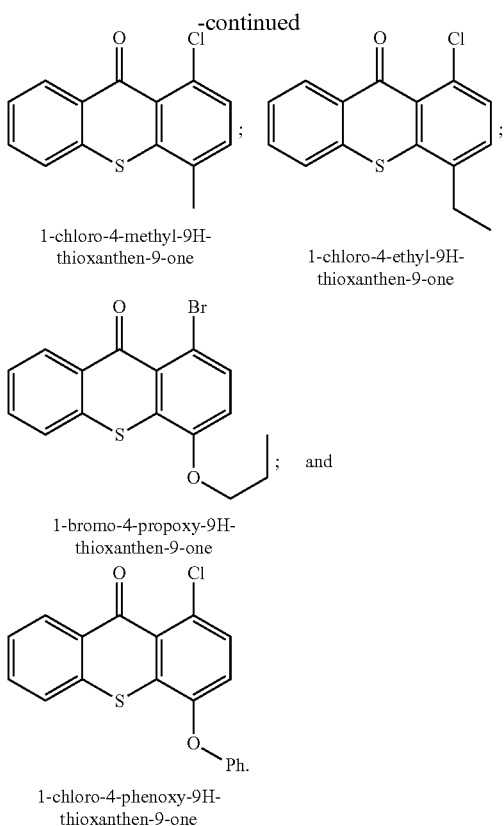

1-chloro-4-methyl-9H-thioxanthen-9-one 1-chloro-4-ethyl-9H-thioxanthen-9-one 1-bromo-4-propoxy-9H-thioxanthen-9-one 1-chloro-4-phenoxy-9H-thioxanthen-9-one Advantageously, it has now been found that any of the compounds of formula (V) which generates a Bronsted acid can be used in the compositions of this invention. The generated Bronsted acid will activate the latent catalysts of formula (II) or (III) thereby initiating the ROMP of monomers of formula (I), and monomers of formula (IV), if present, thus causing the compositions of this invention to form transparent polymeric materials. Generally, any of the Bronsted acids can cause such activation of catalyst. Non-limiting examples of such Bronsted acids include without any limitation hydrofluoric acid, hydrochloric acid, hydrobromic acid, hydroiodic acid, trifluoroacetic acid, trifluoromethanesulfonic acid, and the like. In some embodiments the Bronsted acid generated is hydrochloric acid.

In some embodiments the compounds of formula (V) can be activated at certain wavelength of the electromagnetic radiation which can generally range from about 240 nm to 400 nm. Accordingly, any of the compounds which are active in this electromagnetic radiation can be employed in the compositions of this invention which are stable to the OLED stack. That is, several of the OLEDs used in the LED devices are sensitive to electromagnetic radiation in that they are damaged when exposed to certain wavelengths, such as for example, 365 nm depending upon the OLED employed. Accordingly, any compounds of formula (V) that would not damage the OLED when exposed to radiation at certain wavelengths can be employed herein. In some embodiments the wavelength of the radiation to activate the compounds of formula (V) is 260 nm. In some other embodiments the wavelength of the radiation to activate the compounds of formula (V) is 310 nm. In yet some other embodiments the wavelength of the radiation to activate the compounds of formula (V) is 395 nm.

However, any of the other known photoactive active compounds which generate the Bronsted acid (for example hydrochloric acid) in order to activate the latent catalysts employed herein can also be used in the composition of this invention. All such compounds are part of this invention.

In some embodiments of this invention the composition of this invention may additionally contain other photosensitizer compounds which can activate the organo-transition compound in order to facilitate the mass polymerization of the monomers of formula (I). For this purpose, any suitable sensitizer compound can be employed in the compositions of the present invention. Such suitable sensitizer compounds include, photosensitizers, such as, anthracenes, phenanthrenes, chrysenes, benzpyrenes, fluoranthenes, rubrenes, pyrenes, xanthones, indanthrenes, and mixtures thereof. Generally, the photosensitizers absorb energy from the radiated light source and transfers that energy to the desirable substrate/reactant, which in the present invention is the compound of formula (V) employed in the composition of this invention.

Any amount of latent catalyst and the compound of formula (V) can be employed in the composition of this invention which will bring about the intended result. Generally, the molar ratio of monomer:latent catalyst:compound of formula (V) is in the range of 10,000:1:1 to 5,000:1:1 or lower. In some other embodiments such monomer:latent catalyst:photo active initiator is 15,000:1:1, 20,000:1:1 or higher. Again, as noted, when nanoparticles are employed then there may not be a need to use any other additives to activate the latent catalyst.

Advantageously, it has further been found that the composition according to this invention forms a substantially transparent film when mass polymerized, generally, when exposed to suitable radiation at a wavelength in the range from 260 nm to 400 nm. That is to say, that when the composition of this invention is exposed to suitable radiation, the monomers undergo mass polymerization to form films which are substantially transparent to visible light. That is, most of the visible light is transmitted through the film. In some embodiments such film formed from the composition of this invention exhibits a transmission of equal to or higher than 90 percent of the visible light. In some other embodiments such film formed from the composition of this invention exhibits a transmission of equal to or higher than 95 percent of the visible light. It should be further noted that any radiation that is suitable to carry out this mass polymerization can be employed, such as for example, 395 nm as indicated above. However, any other radiation of suitable wavelength, such as for example 260 nm or 310 nm can also be employed. In some embodiments the wavelength of the radiation employed is such that which will not damage the OLED stack employed.

In some other embodiments the composition of this invention undergoes mass polymerization when exposed to suitable UV irradiation to form a substantially transparent film without damaging the OLED stack. In yet other embodiments the composition of this invention undergoes mass polymerization when exposed to suitable UV irradiation which is substantially free of any monomer or volatile oligomeric product.

It has also been found that various other viscosity modifiers that are compatible with the compositions of this invention can also be employed in order to modulate the viscosity of the composition before subjecting it to the mass polymerization conditions. Suitable examples of such viscosity modifiers include transparent polymers such as for example polystyrene, polyesters (polyethylene terphthalate, PET), and the like.

In another embodiment of this invention, the composition of this invention encompasses 5-phenethylbicyclo[2.2.1]hept-2-ene (PENB), 1,3-bis(2,4,6-trimethylphenylimidazolidin-2-ylidene)(tricyclohexylphosphine)-(2-oxobenzylidene)ruthenium(VI) iodide and 1-chloro-4-propoxy-9H-thioxanthen-9-one (CPTX).

In another embodiment of this invention, the composition of this invention encompasses 5-phenethylbicyclo[2.2.1]hept-2-ene (PENB), 1,3-bis(2,4,6-trimethylphenylimidazolidin-2-ylidene)(tricyclohexylphosphine)-(2-oxobenzylidene)ruthenium(VI) iodide, 1-chloro-4-propoxy-9H-thioxanthen-9-one (CPTX) and polystyrene.

In another embodiment of this invention, the composition of this invention encompasses 5-phenethylbicyclo[2.2.1]hept-2-ene (PENB), 1,4-di(bicyclo[2.2.1]hept-5-en-2-yl)butane (NBBuNB), 1,3-bis(2,4,6-trimethylphenylimidazolidin-2-ylidene)(tricyclohexylphosphine)-(2-oxobenzylidene)ruthenium(VI) chloride and 1-chloro-4-propoxy-9H-thioxanthen-9-one (CPTX).

In yet another embodiment of this invention, the composition of this invention encompasses 5-phenethylbicyclo[2.2.1]hept-2-ene (PENB), 1,2,3,4,4a,5,8,8a-octahydro-1,4:5,8-dimethanonaphthalene (TD), 1,3-bis(2,4,6-trimethylphenylimidazolidin-2-ylidene)(tricyclohexylphosphine)-(2-oxobenzylidene)ruthenium(VI) chloride and 1-chloro-4-propoxy-9H-thioxanthen-9-one (CPTX).

In yet another embodiment of this invention, the composition of this invention encompasses 5-phenethylbicyclo[2.2.1]hept-2-ene (PENB), 1,2,3,4,4a,5,8,8a-octahydro-1,4:5,8-dimethanonaphthalene (TD), 3a,4,7,7a-tetrahydro-1H-4,7-methanoindene (DCPD), 1,3-bis(2,4,6-trimethylphenylimidazolidin-2-ylidene)(tricyclohexylphosphine)-(2-oxobenzylidene)ruthenium(VI) chloride and 1-chloro-4-propoxy-9H-thioxanthen-9-one (CPTX).

In yet another embodiment of this invention, the composition of this invention encompasses 5-(2-([1,1'-biphenyl]-2-yloxy)ethyl)bicyclo[2.2.1]hept-2-ene (NBEtOPhPh), 1,3-bis(2,4,6-trimethylphenylimidazolidin-2-ylidene)(tricyclohexylphosphine)-(2-oxobenzylidene)ruthenium(VI) chloride and I-chloro-4-propoxy-9H-thioxanthen-9-one (CPTX).

In yet another embodiment of this invention, the composition of this invention encompasses 5-hexylbicyclo[2.2.1]hept-2-ene (HexylNB), 1,3-bis(2,4,6-trimethylphenyl-imidazolidin-2-ylidene)(tricyclohexylphosphine)-(2-oxobenzylidene)ruthenium(VI) chloride and 1-chloro-4-propoxy-9H-thioxanthen-9-one (CPTX).

In yet another embodiment of this invention, the composition of this invention encompasses 5-decylbicyclo[2.2.1]hept-2-ene (DecylNB), 1,3-bis(2,4,6-trimethylphenyl-imidazolidin-2-ylidene)(tricyclohexylphosphine)-(2-oxobenzylidene)ruthenium(VI) chloride and 1-chloro-4-propoxy-9H-thioxanthen-9-one (CPTX).

In yet another embodiment of this invention, the composition of this invention encompasses 5-butylbicyclo[2.2.1]hept-2-ene (BuNB), 3a,4,7,7a-tetrahydro-1H-4,7-methanoindene (DCPD), 1,3-bis(2,4,6-trimethylphenyl-imidazolidin-2-ylidene)(tricyclohexyl-phosphine)-(2-oxobenzylidene)ruthenium(VI) chloride and I-chloro-4-propoxy-9H-thioxanthen-9-one (CPTX).

In yet another embodiment of this invention, the composition of this invention encompasses 5-decylbicyclo[2.2.1]hept-2-ene (DecylNB), 3a,4,7,7a-tetrahydro-1H-4,7-methanoindene (DCPD), 1,3-bis(2,4,6-trimethylphenyl-imidazolidin-2-ylidene)(tricyclohexyl-phosphine)-(2-oxobenzylidene)ruthenium(VI) chloride and 1-chloro-4-propoxy-9H-thioxanthen-9-one (CPTX).

In yet another embodiment of this invention, the composition of this invention encompasses 5-phenethylbicyclo[2.2.1]hept-2-ene (PENB), 5-(2-([1,1'-biphenyl]-4-yl)ethyl)bicyclo[2.2.1]hept-2-ene (NBEtPhPh), 1,3-bis(2,4,6-trimethylphenylimidazolidin-2-ylidene)(tricyclohexylphosphine)-(2-oxobenzylidene)ruthenium(VI) chloride and I-chloro-4-propoxy-9H-thioxanthen-9-one (CPTX).

In a further aspect of this invention there is provided a kit for forming a substantially transparent film. There is dispensed in this kit a composition of this invention. Accordingly, in some embodiments there is provided a kit in which there is dispensed one or more monomers of formula (I), optionally one or more monomers of formula (IV) and a compound of formula (V), so as to obtain a desirable result and/or for intended purpose. Further, said kit comprises a latent catalyst as described herein. The monomers of formulae (I) or (IV) are the ones as described hereinabove.

In some embodiments, the aforementioned kit encompasses two or more monomers of formula (I) distinct from one another as described hereinabove. In some other embodiments the kit of this invention encompasses at least two monomers wherein first monomer facilitates dissolution of the second monomer and/or the latent catalyst and the additives as described hereinabove. Any of the monomers of formula (I) as described herein can be used in this embodiment. The molar ratio of first and the second monomer of formula (I) contained in these components can vary and may range from 1:99 to 99:1, or 10:90 to 90:10, 20:80 to 80:20, 30:70 to 70:30, 60:40 to 40:60 or 50:50, and so on. In some other embodiments the kit may encompass a composition wherein dispensed more than two monomers of formula (I), each distinct from one another. Further, as noted the first monomer of formula (I) is completely soluble in the second monomer of formula (I) to form a clear solution at room temperature. In some embodiments the monomer mixture may become a clear solution at slightly elevated temperature, such as for example, 30° C. or 40° C. or 50° C., before they undergo mass polymerization. In another aspect of this embodiment of this invention the composition of this invention undergoes mass polymerization when exposed to a suitable radiation for a sufficient length of time to form a polymeric film. That is to say that the composition of this invention is poured onto a surface or onto a substrate which needs to be encapsulated, and exposed to a suitable radiation in order for the monomers to undergo polymerization to form a solid transparent polymer which could be in the form of a transparent film. Generally, as already noted above, such polymerization can take place when exposed to suitable radiation at a wavelength from about 260 nm to 400 nm or higher. The exposure can be at stages from 260 nm to 400 nm or at suitable wavelengths as described herein. By practice of this invention it is now possible to obtain polymeric films on such substrates which are substantially transparent film. The "substantially transparent film" as used herein means that the films formed from the composition of this invention are optically clear in the visible light. Accordingly, in some embodiments of this invention such films are having at least 90 percent of visible light transmission, in some other embodiments the films formed from the composition of this invention exhibit at least 95 percent of visible light transmission.

Various mixtures of one or more monomers of formula (I) in combination with one or more monomers of formula (IV), if needed, can be used to form a kit of this invention, which further includes a compound of formula (V) and at least one ruthenium compound of formulae (IIA), (IIB), (IIIA), (IIIB) or (IIIC). In some embodiments, the kit as described herein encompasses a composition, which contains 5-phenethylbicyclo[2.2.1]hept-2-ene (PENB), 1,3-bis(2,4,6-trimethylphenylimidazolidin-2-ylidene)(tricyclohexylphosphine)-(2-oxobenzylidene)ruthenium(VI) iodide and 1-chloro-4-propoxy-9H-thioxanthen-9-one (CPTX).

In some other embodiments, the kit as described herein encompasses a composition, which contains 5-phenethylbicyclo[2.2.1]hept-2-ene (PENB), 1,3-bis(2,4,6-trimethylphenylimidazolidin-2-ylidene)(tricyclohexylphosphine)-(2-oxobenzylidene)ruthenium(VI) iodide, 1-chloro-4-propoxy-9H-thioxanthen-9-one (CPTX) and polystyrene.

In another embodiment, the kit as described herein encompasses a composition, which contains 5-phenethylbicyclo[2.2.1]hept-2-ene (PENB), 1,4-di(bicyclo[2.2.1]hept-5-en-2-yl)butane (NBBuNB), 1,3-bis(2,4,6-trimethylphenylimidazolidin-2-ylidene)(tricyclohexylphosphine)-(2-oxobenzylidene)ruthenium(VI) chloride and 1-chloro-4-propoxy-9H-thioxanthen-9-one (CPTX).

In yet another embodiment of this invention, the kit as described herein encompasses a composition, which contains 5-phenethylbicyclo[2.2.1 I]hept-2-ene (PENB), 1,2,3,4,4a,5,8,8a-octahydro-1,4:5,8-dimethanonaphthalene (TD), 1,3-bis(2,4,6-trimethylphenylimidazolidin-2-ylidene)(tricyclohexylphosphine)-(2-oxobenzylidene)ruthenium(VI) chloride and 1-chloro-4-propoxy-9H-thioxanthen-9-one (CPTX).

In yet another embodiment of this invention, the kit as described herein encompasses a composition, which contains 5-phenethylbicyclo[2.2.1]hept-2-ene (PENB), 1,2,3,4,4a,5,8,8a-octahydro-1,4:5,8-dimethanonaphthalene (TD), 3a,4,7,7a-tetrahydro-1H-4,7-methanoindene (DCPD), 1,3-bis(2,4,6-trimethylphenylimidazolidin-2-ylidene)(tricyclohexylphosphine)-(2-oxobenzylidene)ruthenium(VI) chloride and 1-chloro-4-propoxy-9H-thioxanthen-9-one (CPTX).

In yet another embodiment of this invention, the kit as described herein encompasses a composition, which contains 5-(2-([1,1'-biphenyl]-2-yloxy)ethyl)bicyclo[2.2.1]hept-2-ene (NBEtOPhPh), 1,3-bis(2,4,6-trimethylphenylimidazolidin-2-ylidene)(tricyclohexylphosphine)-(2-oxobenzylidene)ruthenium(VI) chloride and 1-chloro-4-propoxy-9H-thioxanthen-9-one (CPTX).

In yet another embodiment of this invention, the kit of this invention encompasses 5-hexylbicyclo[2.2.1]hept-2-ene (HexylNB), 1,3-bis(2,4,6-trimethylphenyl-imidazolidin-2-ylidene)(tricyclohexylphosphine)-(2-oxobenzylidene)ruthenium(VI) chloride and 1-chloro-4-propoxy-9H-thioxanthen-9-one (CPTX).

In yet another embodiment of this invention, the kit of this invention encompasses 5-decylbicyclo[2.2.1 I]hept-2-ene (DecylNB), 1,3-bis(2,4,6-trimethylphenyl-imidazolidin-2-ylidene)(tricyclohexylphosphine)-(2-oxobenzylidene)ruthenium(VI) chloride and 1-chloro-4-propoxy-9H-thioxanthen-9-one (CPTX).

In yet another embodiment of this invention, the kit of this invention encompasses 5-butylbicyclo[2.2.1]hept-2-ene (BuNB), 3a,4,7,7a-tetrahydro-1H-4,7-methanoindene (DCPD), 1,3-bis(2,4,6-trimethylphenyl-imidazolidin-2-ylidene)(tricyclohexyl-phosphine)-(2-oxobenzylidene)ruthenium(VI) chloride and 1-chloro-4-propoxy-9H-thioxanthen-9-one (CPTX).

In yet another embodiment of this invention, the kit of this invention encompasses 5-decylbicyclo[2.2.1]hept-2-ene (DecylNB), 3a,4,7,7a-tetrahydro-1H-4,7-methanoindene (DCPD), 1,3-bis(2,4,6-trimethylphenyl-imidazolidin-2-ylidene)(tricyclohexyl-phosphine)-(2-oxobenzylidene)ruthenium(VI) chloride and 1-chloro-4-propoxy-9H-thioxanthen-9-one (CPTX).

In yet another embodiment of this invention, the kit of this invention encompasses 5-phenethylbicyclo[2.2.1]hept-2-ene (PENB), 5-(2-([1,1'-biphenyl]-4-yl)ethyl)bicyclo[2.2.1]hept-2-ene (NBEtPhPh), 1,3-bis(2,4,6-trimethylphenylimidazolidin-2-ylidene)(tricyclohexyl-phosphine)-(2-oxobenzylidene)ruthenium(VI) chloride and 1-chloro-4-propoxy-9H-thioxanthen-9-one (CPTX).

In another aspect of this invention there is further provided a composition comprising one or more monomers of formula (I), optionally one or more monomers of formula (IV), a latent catalyst, a compound of formula (V) as described hereinabove. Any of the monomers of formula (I) as described hereinabove can be used in this aspect of the invention, optionally in combination with one or more monomers of formula (IV). The monomers of formula (I) featuring a refractive index of at least 1.5 and viscosity below 50 centipoise are generally employed. When more than two monomers of formula (I) are employed the first monomer is completely miscible with the second monomer and forms a clear solution. When the composition is exposed to suitable irradiation forms a substantially transparent film having a transmission higher than 90 percent of the visible light.

In yet another aspect of this invention there is further provided a method of forming a substantially transparent film for the fabrication of a variety of optoelectronic device comprising:

forming a homogeneous clear composition comprising one or more monomers of formula (I), a latent catalyst and a compound of formula (V), optionally in combination with one or more monomers of formula (IV);

coating a suitable substrate with the composition or pouring the composition onto a suitable substrate to form a film; and exposing the film to a suitable radiation to cause polymerization of the monomers.

The coating of the desired substrate to form a film with the composition of this invention can be performed by any of the coating procedures as described herein and/or known to one skilled in the art, such as by spin coating. Other suitable coating methods include without any limitation spraying, doctor blading, meniscus coating, ink jet coating and slot coating. The mixture can also be poured onto a substrate to form a film. Suitable substrate includes any appropriate substrate as is, or may be used for electrical, electronic or optoelectronic devices, for example, a semiconductor substrate, a ceramic substrate, a glass substrate. Generally, the composition undergoes mass polymerization when exposed to suitable radiation substantially free of any volatile monomeric or polymeric material.

The films thus formed are then evaluated for their optical properties using any of the methods known in the art. For example, the refractive index of the film across the visible spectrum can be measured by ellipsometry. The optical quality of the film can be determined by visual observation. Quantitatively the percent transparency can be measured by visible spectroscopy. Generally, the films formed according to this invention exhibit excellent optical transparent properties and can be tailored to desirable refractive index as described herein.

Accordingly, in some of the embodiments of this invention there is also provided an optically transparent film obtained by the mass polymerization of the composition as described herein. In another embodiment there is also provided an optoelectronic device comprising the transparent film of this invention as described herein.

The following examples are detailed descriptions of methods of preparation and use of certain compounds/monomers, polymers and compositions of the present invention. The detailed preparations fall within the scope of, and serve to exemplify, the more generally described methods of preparation set forth above. The examples are presented for illustrative purposes only, and are not intended as a restriction on the scope of the invention. As used in the examples and throughout the specification the ratio of monomer to catalyst is based on a mole to mole basis.

EXAMPLES

The following abbreviations have been used hereinbefore and hereafter in describing some of the compounds, instruments and/or methods employed to illustrate certain of the embodiments of this invention:
PENB—5-phenethylbicyclo[2.2.1]hept-2-ene; NBBuNB—1,4-di(bicyclo[2.2.1]hept-5-en-2-yl)butane; TD—1,2,3,4,4a,5,8,8a-octahydro-1,4:5,8-dimethanonaphthalene; DCPD—3a,4,7,7a-tetrahydro-1H-4,7-methanoindene; NBEtOPhPh—5-(2-([1,1'-biphenyl]-2-yloxy)ethyl)bicyclo[2.2.1]hept-2-ene; BuNB—5-butylbicyclo[2.2.1]hept-2-ene; HexylNB—5-hexylbicyclo[2.2.1]hept-2-ene; DecylNB—5-decylbicyclo[2.2.1]hept-2-ene; Ru—I—1,3-bis(2,4,6-trimethylphenylimidazolidin-2-ylidene)(tricyclohexylphosphine)-(2-oxobenzylidene)ruthenium(VI) iodide; CPTX—1-chloro-4-propoxy-9H-thioxanthen-9-one; DSC—differential scanning calorimetry; TGA—thermogravimetric analysis.

Various monomers as used herein are either commercially available or can be readily prepared following the procedures as described in the co-pending U.S. patent application Ser. No. 15/253,980, filed Sep. 1, 2016.

The following Examples demonstrate that the compositions of this invention are quite stable at 35° C. for several days and can very readily be mass polymerized by exposing to a suitable radiation as specified below.

Example 1

Mass Polymerization of PENB

In a glass bottle, Ru—I (0.0046 g, 0.005 mmol) and CPTX (0.0030 g 0.01 mmol) were dissolved in PENB (10 g, 50.42 mmol) without solvent to form a clear solution, the monomer to catalyst ratio was at 10,000:1. The solution was UV light exposed (LED 5 W, 395 nm, 3 minutes). The solution turned to a solid indicating the monomer was fully polymerized, as confirmed by both DSC and TGA. The unexposed solution was free flowing even after 3 days at room temperature. This indicates that during the UV exposure CPTX releases a chloride ion that activates Ru—I catalyst.

Examples 2-17

The procedures of Example 2 were substantially repeated in these Examples 2 to 17 except that various different monomers and loadings as listed in Table 1 were employed. The monomer used in each of these Examples 2 to 17, catalyst loading, CPTX loading and the residue percentage from isothermal TGA (1 h at 100° C.) after UV exposure are summarized in Table 1.

TABLE 1

| Example No. | Monomer (g, mmol) | Ru-II loading, g, mmol | CPTX loading, g, mmol | TGA residue, % |
|---|---|---|---|---|
| 2 | PENB (10, 50.42) | 0.0046, 0.005 | 0.0015, 0.005 | 99.94 |
| 3 | PENB (10, 50.42) | 0.0046, 0.005 | 0.0060, 0.02 | 99.95 |
| 4 | PENB/NBBuNB 95/5 mole ratio (10, 49.87) | 0.0046, 0.005 | 0.0015, 0.005 | 99.99 |
| 5 | PENB/NBBuNB 95/5 mole ratio (10, 49.87) | 0.0046, 0.005 | 0.0030, 0.01 | 99.26 |
| 6 | PENB/NBBuNB 95/5 mole ratio (10, 49.87) | 0.0046, 0.005 | 0.0060, 0.02 | 99.23 |
| 7 | PENBNBBuNB 95/5 mole ratio (10, 49.87) | 0.0092, 0.01 | 0.0060, 0.02 | 99.14 |
| 8 | PENB/NBBuNB 95/5 mole ratio (10, 49.87) | 0.0092, 0.01 | 0.0120, 0.04 | 95.95 |
| 9 | PENB/NBBuNB 50/50 mole ratio (10, 45.37) | 0.0042, 0.0046 | 0.0056, 0.0184 | 97.65 |
| 10 | PENB/TD 50/50 mole ratio (10, 55.77) | 0.0051, 0.0055 | 0.0067, 0.022 | 99.75 |
| 11 | PENB/TD/DCPD 50/25/25 mole ratio (10, 58.04) | 0.0053, 0.0057 | 0.007, 0.023 | 99.54 |
| 12 | NBEtOPhPh (10, 34.48) | 0.0027, 0.0034 | 0.0042, 0.014 | 99.67 |
| 13 | HexylNB (10, 56.08) | 0.0044, 0.0056 | 0.0068, 0.022 | 100 |
| 14 | DecylNB (10, 42.65) | 0.0034, 0.0043 | 0.0052, 0.0017 | 99.89 |
| 15 | DCPD/BuNB 91/9 mole ratio (10, 74.71) | 0.0059, 0.0075 | 0.0091, 0.0030 | 99.06 |
| 16 | DCPD/DecylNB 91/9 mole ratio (10, 70.71) | 0.0056, 0.0071 | 0.0086, 0.0028 | 99.82 |
| 17 | DCPD/DecylNB 97/3 mole ratio (10, 73.92) | 0.0059, 0.0074 | 0.0090, 0.0030 | 99.66 |

Comparative Example 1

In a glass bottle, Ru—I (0.0046 g, 0.005 mmol) and ITX (0.0025 g 0.01 mmol) were dissolved in PENB (10 g, 50.42 mmol) without solvent to form a clear solution, the monomer to catalyst ratio was at 10,000:1. The solution was UV light exposed (LED 5 W, 395 nm, 3 minutes). The solution was free flowing and no change in viscosity was observed indicating that the catalyst was still inactive under these conditions.

ITX is 2-isopropylthioxanthone of the following formula:

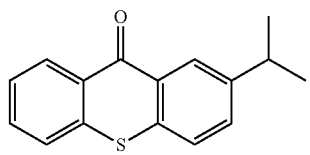 [SMILES: CC(C)c1ccc2sc3ccccc3c(=O)c2c1]

What is claimed is:

1. A composition comprising:
an one or more monomers of formula (I):

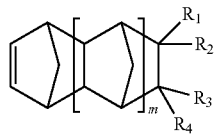

wherein;
m is an integer 0, 1 or 2;
$R_1$, $R_2$, $R_3$ and $R_4$ are the same or different and each independently selected from the group consisting of hydrogen, halogen, methyl, ethyl, linear or branched $(C_3-C_{16})$alkyl, perfluoro$(C_1-C_{12})$alkyl, hydroxy$(C_1-C_{16})$alkyl, $(C_3-C_{12})$cycloalkyl, $(C_6-C_{12})$bicycloalkyl, $(CH_2)_a$—$(C_6-C_{12})$bicycloalkenyl, $(C_7-C_{14})$tricycloalkyl, substituted or unsubstituted $(C_6-C_{10})$aryl, substituted or unsubstituted $(C_6-C_{10})$aryl$(C_1-C_6)$alkyl, perfluoro$(C_6-C_{10})$aryl, perfluoro$(C_6-C_{10})$aryl$(C_1-C_3)$alkyl and a group of formula (A):

—Z-Aryl        (A)

wherein:
Z is a bond or a group selected from the group consisting of:
$(CR_5R_6)_a$, $O(CR_5R_6)_a$, $(CR_5R_6)_aO$, $(CR_5R_6)_a$—O—$(CR_5R_6)_b$, $(CR_5R_6)_a$—O—$(SiR_5R_6)_b$, $(CR_5R_6)_a$—$(CO)O$—$(CR_5R_6)_b$, $(CR_5R_6)_a$—$O(CO)$—$(CR_5R_6)_b$ and $(CR_5R_6)_a$—$(CO)$—$(CR_5R_6)_b$, where a and b are integers which may be the same or different and each independently is 1 to 12, inclusive;
$R_5$ and $R_6$ are the same or different and each independently selected from the group consisting of hydrogen, methyl, ethyl, linear or branched $(C_3-C_6)$alkyl, hydroxy, methoxy, ethoxy, linear or branched $(C_3-C_6)$alkyloxy, acetoxy, $(C_2-C_6)$acyl, hydroxymethyl, hydroxyethyl, linear or branched hydroxy$(C_3-C_6)$alkyl, substituted or unsubstituted phenyl and substituted or unsubstituted phenoxy;
Aryl is phenyl or phenyl substituted with one or more of groups selected from the group consisting of methyl, ethyl, linear or branched $(C_3-C_6)$alkyl, hydroxy, methoxy, ethoxy, linear or branched $(C_3-C_6)$alkyloxy, acetoxy, $(C_2-C_6)$acyl, hydroxymethyl, hydroxyethyl, linear or branched hydroxy$(C_3-C_6)$alkyl, phenyl and phenoxy; or
one of $R_1$ or $R_2$ taken together with one of $R_3$ or $R_4$ and the carbon atoms to which they are attached to form a $(C_5-C_7)$carbocyclic ring optionally containing one or more double bonds;
b) a latent organo-transition metal catalyst comprising a metal selected from the group consisting of ruthenium and osmium; and
c) a compound capable of releasing a Bronsted acid when subjected to photolytic conditions which is of the formula:

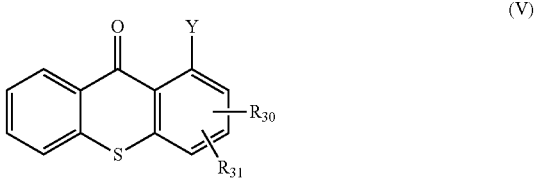

wherein
Y is halogen; and
$R_{30}$ and $R_{31}$ are the same or different and independently of each other selected from the group consisting of hydrogen, methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy $(C_1-C_3)$alkyl and $(C_6-C_{10})$-aryloxy; and wherein
said composition is in a clear liquid form at room temperature.

2. The composition according to claim 1, wherein said composition comprises first and second monomer of formula (I) distinct from each other and one of said first and second monomers having a refractive index of at least 1.5 and viscosity below 50 centipoise, and wherein said first monomer is completely miscible with said second monomer to form a clear solution.

3. The composition according to claim 1, wherein said composition forms a substantially transparent film when exposed to suitable radiation.

4. The composition according to claim 3, wherein said film has a transmission of equal to or higher than 90 percent of the visible light.

5. The composition according to claim 3, wherein said film has a transmission of equal to or higher than 95 percent of the visible light.

6. The composition according to claim 1, wherein the monomer of formula (I) is selected from the group consisting of:

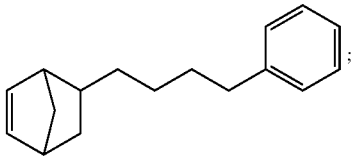

5-(4-phenylbutyl)bicyclo[2.2.1]hept-2-ene

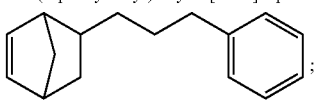

5-(3-phenylpropyl)bicyclo[2.2.1]hept-2-ene

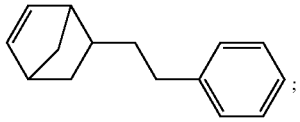

5-phenethylbicyclo[2.2.1]hept-2-ene (PENB)

-continued

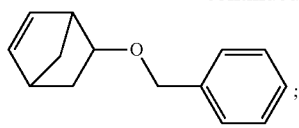

5-(benzyloxy)bicyclo[2.2.1]hept-2-ene

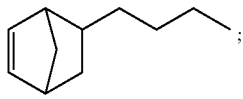

5-butylbicyclo[2.2.1]hept-2-ene (BuNB)

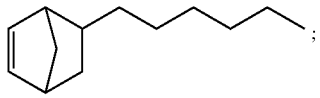

5-hexylbicyclo[2.2.1]hept-2-ene (HexylNB)

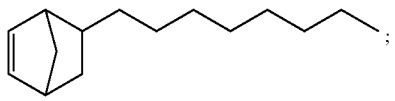

5-octylbicyclo[2.2.1]hept-2-ene (OctNB)

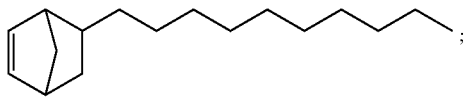

5-decylbicyclo[2.2.1]hept-2-ene (DecNB)

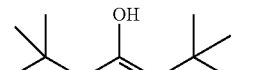

AOAONB

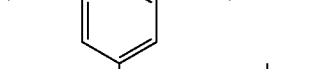

AONB

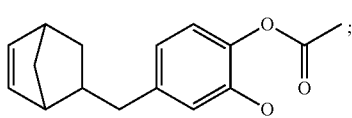

5-norbornenylmethyleugenyl acetate (EuAcNB)

-continued

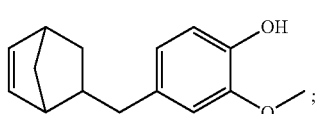

5-norbornenylmethyleugenol (EuOHNB)

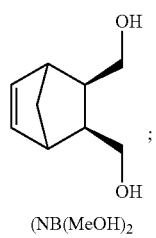

(NB(MeOH)$_2$)

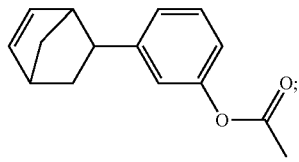

PhAcNB

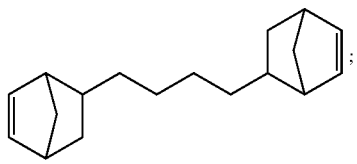

1,4-di(bicyclo[2.2.1]hept-5-en-2-yl)butane (NBBuNB)

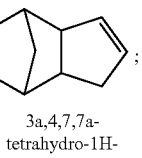

3a,4,7,7a-tetrahydro-1H-4,7-methanoindene (DCPD)

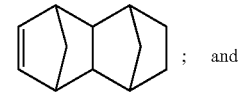   and 1,2,3,4,4a,5,8,8a-octahydro-1,4:5,8-dimethanonaphthalene (TD)

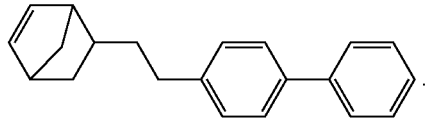

5-(2-([1,1'-biphenyl]-4-yl)ethyl)bicyclo[2.2.1]hept-2-ene (NBEtPhPh)

7. The composition according to claim 1, wherein the latent catalyst is an organo-ruthenium compound selected from the group consisting of a compound of formula (IIIA), a compound of formula (IIB), a compound of formula (IIIA), a compound of formula (IIIB) and a compound of formula (IIIC):

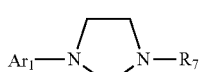

(IIA)

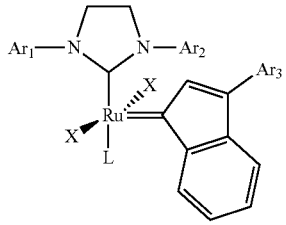

(IIB)

-continued

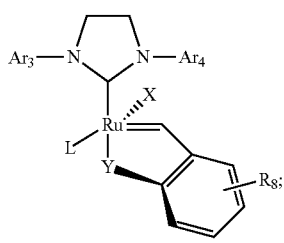

(IIIA)

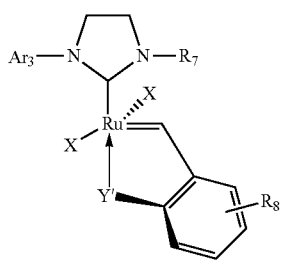

(IIIB)

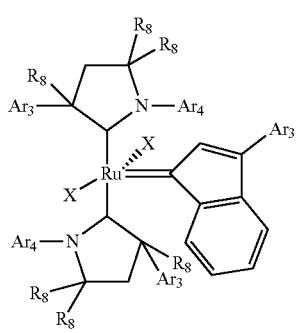

(IIIC)

wherein:
X is selected from the group consisting of chlorine, bromine, iodine, —$OR_a$, —$O(CO)R_a$ and —$OSO_2R_a$, where $R_a$ is selected from the group consisting of ($C_1$-$C_{12}$)alkyl, ($C_3$-$C_{12}$)cycloalkyl and ($C_6$-$C_{14}$)aryl;
Y is selected from the group consisting of O, S and $NCOCF_3$;
Y' is selected from the group consisting of $OR_9$, $SR_9$ and —N═CHC(O)O($C_1$-$C_6$)alkyl, where $R_9$ is selected from the group consisting of methyl, ethyl, linear or branched ($C_1$-$C_6$)alkyl, ($C_6$-$C_{10}$)aryl, methoxy, ethoxy, linear or branched ($C_1$-$C_6$)alkoxy, ($C_6$-$C_{10}$)aryloxy and —$OCH(CH_3)C(O)N(CH_3)(OCH_3)$;
L is selected from the group consisting of pyridine, $PR_3$ or O═$PR_3$, where each R is independently selected from the group consisting of isopropyl, sec-butyl, tert-butyl, cyclohexyl, bicyclo($C_5$-$C_{10}$)alkyl, phenyl, benzyl, isopropoxy, sec-butoxy, tert-butoxy, cyclohexyloxy phenoxy and benzyloxy;
$R_7$ is selected from the group consisting of isopropyl, sec-butyl, tert-butyl substituted or unsubstituted cyclohexyl, substituted or unsubstituted phenyl, substituted or unsubstituted biphenyl and substituted or unsubstituted naphthyl;
$R_8$ is selected from the group consisting of chlorine, methyl, ethyl, linear or branched ($C_1$-$C_6$)alkyl, ($C_6$-$C_{10}$)aryl, methoxy, ethoxy, linear or branched ($C_1$-$C_6$)alkoxy, ($C_6$-$C_{10}$)aryloxy, —NHCO($C_1$-$C_6$)alkyl, —NHCO-perfluoro($C_1$-$C_6$)alkyl, —$SO_2N(($C_1$-$C_6$)alkyl)_2$ and —$NO_2$;
$Ar_1$, $Ar_2$ $Ar_3$ and $Ar_4$ are the same or different and each independently selected from the group consisting of substituted or unsubstituted phenyl, substituted or unsubstituted biphenyl and substituted or unsubstituted naphthyl;
wherein said substituents are selected from the group consisting of methyl, ethyl, iso-propyl, tert-butyl, phenyl and $OSi(SiMe_3)_3$, where Me is methyl.

8. The composition according to claim 7, wherein the organo-ruthenium compound is selected from the group consisting of:

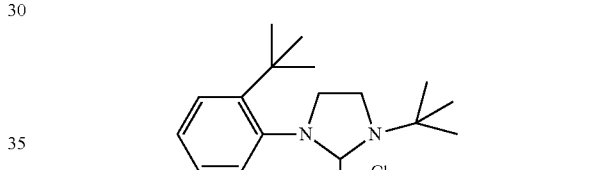

1,3-bis(2,4,6-trimethylphenylimidazolidin-2-ylidene)(tricyclohexylphosphine)-(2-oxobenzylidene)ruthenium (VI) chloride;

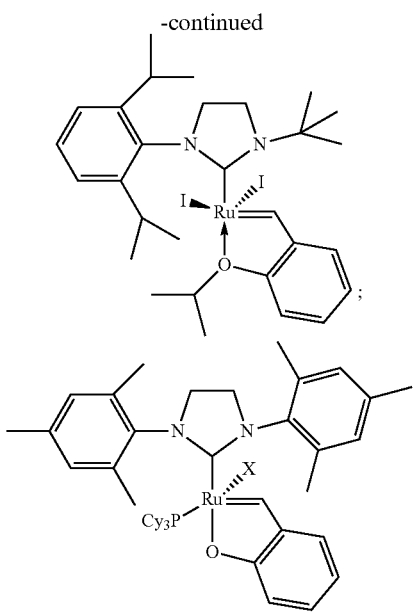

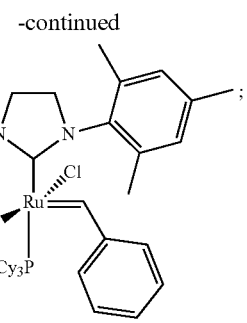

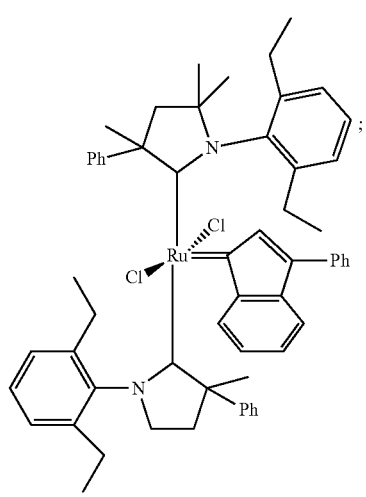

where Cy is cyclohexyl and X is selected from the group consisting of bromine, iodine, —OR$_a$, —O(CO)R$_a$ and —OSO$_2$R$_a$, where R$_a$ is selected from the group consisting of (C$_1$-C$_{12}$)alkyl, (C$_3$-C$_{12}$)cycloalkyl and (C$_6$-C$_{14}$)aryl;

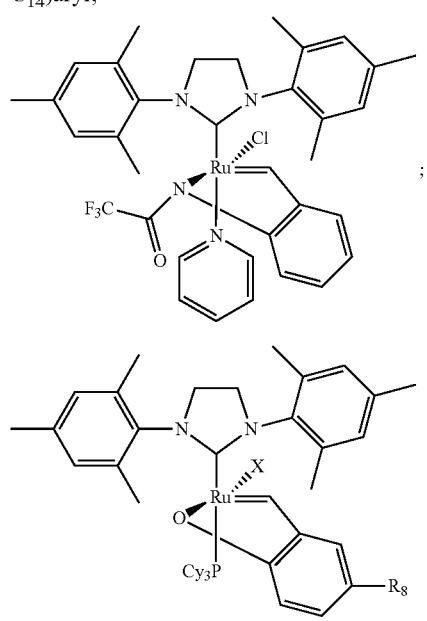

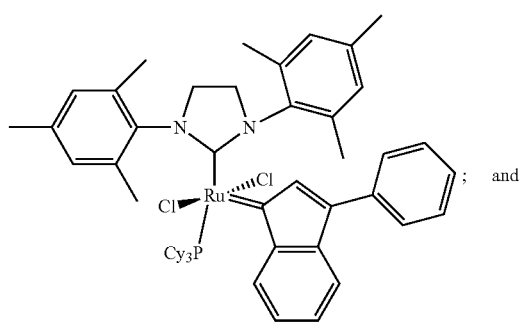

where X is Cl or I, Cy is cyclohexyl an R$_8$ or Cl;

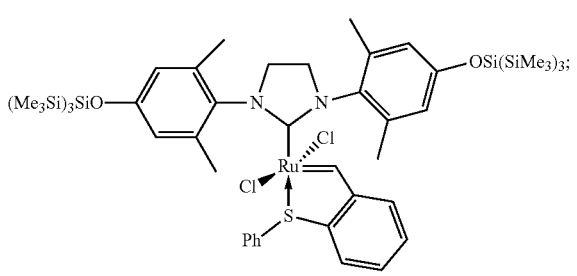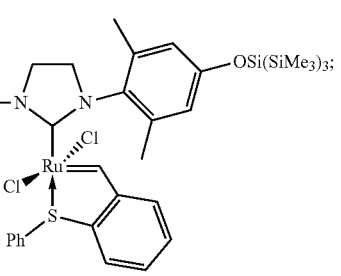

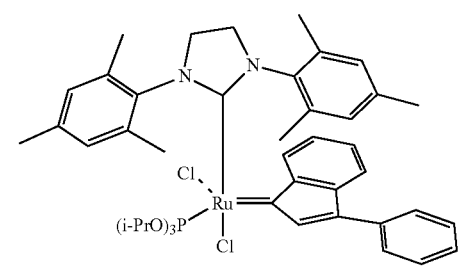

cis-[1,3-Bis(2,4,6-trimethylphenyl)-2-imidazolidi-nylidene]dichloro(3-phenyl-1H-inden-1-ylidene)(tri-isopropylphosphite)ruthenium(II).

9. The composition according to claim 1 further comprising one or more monomers of formula (IV):

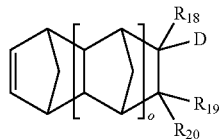

wherein:
o is an integer from 0 to 2, inclusive;
D is $SiR_{21}R_{22}R_{23}$ or a group selected from:

$$—(CH_2)_c—O—SiR_{21}R_{22}R_{23} \quad (E);$$

$$—(CH_2)_c—SiR_{21}R_{22}R_{23} \quad (F); \text{ and}$$

$$—(SiR_{21}R_{22})_c—O—SiR_{21}R_{22}R_{23} \quad (G); \text{ wherein}$$

c is an integer from 1 to 10, inclusive, and where one or more of $CH_2$ is optionally substituted with $(C_1-C_{10})$alkyl, $(C_1-C_{10})$perfluoroalkyl or $(C_6-C_{14})$aryl;
$R_{18}$, $R_{19}$ and $R_{20}$ are the same or different and independently of each other selected from the group consisting of hydrogen, halogen, methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl and $(C_6-C_{10})$aryloxy; and
$R_{21}$, $R_{22}$ and $R_{23}$ are each independently of one another selected from the group consisting of methyl, ethyl, linear or branched $(C_3-C_9)$alkyl, substituted or unsubstituted $(C_6-C_{14})$aryl, methoxy ethoxy, linear or branched $(C_3-C_9)$alkoxy and substituted or unsubstituted $(C_6-C_{14})$aryloxy.

10. The composition according to claim 9, wherein said monomer of formula (IV) is selected from the group consisting of:

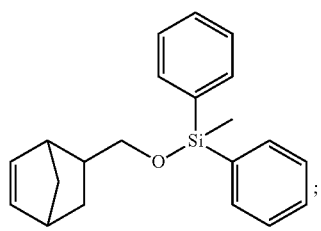

(bicyclo[2.2.1]hept-5-en-2-ylmethoxy)(methyl)diphenylsilane
(NBCH₂OSiMePh₂)

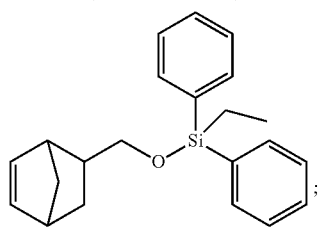

(bicyclo[2.2.1]hept-5-en-2-ylmethoxy)(ethyl)diphenylsilane

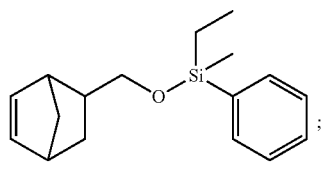

(bicyclo[2.2.1]hept-5-en-2-ylmethoxy)(ethyl)(methyl)(phenyl)silane

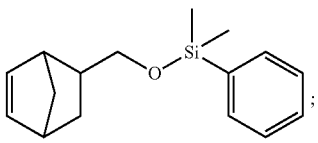

(bicyclo[2.2.1]hept-5-en-2-ylmethoxy)dimethyl(phenyl)silane

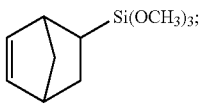 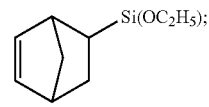

bicyclo-[2.2.1]hept-5-en-2-yltrimethoxysilane (TMSNB)    bicyclo-[2.2.1]hept-5-en-2-yltriethoxysilane (NBSi(OC₂H₅)₃)

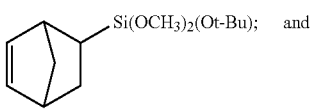

bicyclo-[2.2.1]hept-5-en-2-yl(tert-butoxy)dimethoxysilane

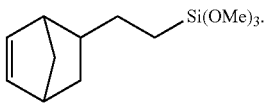

(2-(bicyclo[2.2.1]hept-5-en-2-yl)ethyl)trimethoxysilane

11. The composition according to claim 1, wherein the latent organo-transition metal catalyst is an organo-ruthenium compound selected from the group consisting of:

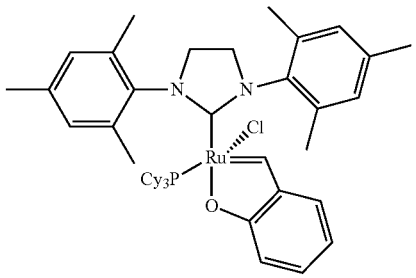

1,3-bis(2,4,6-trimethylphenylimiidazolidin-2-ylidene)(tricyclohexylphosphine)-(2-oxobenzylidene)ruthenium(VI) chloride;

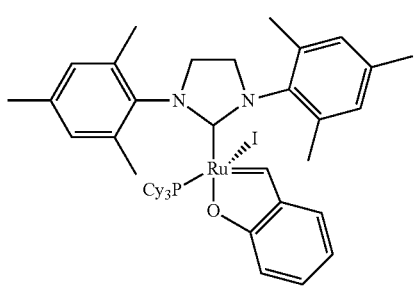

1,3-bis(2,4,6-trimethylphenylimidazolidin-2-ylidene)(tricyclohexylphosphine)-(2-oxobenzylidene)ruthenium iodide;

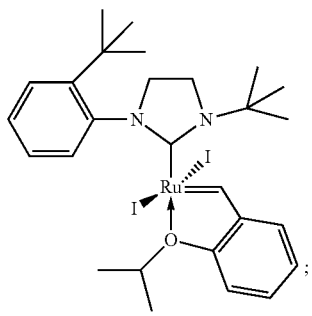

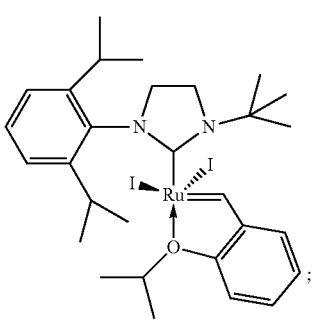

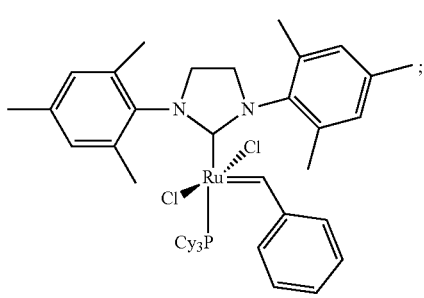

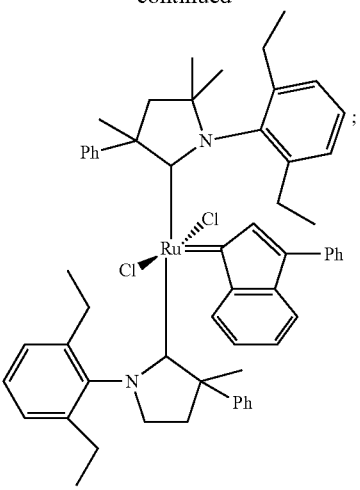

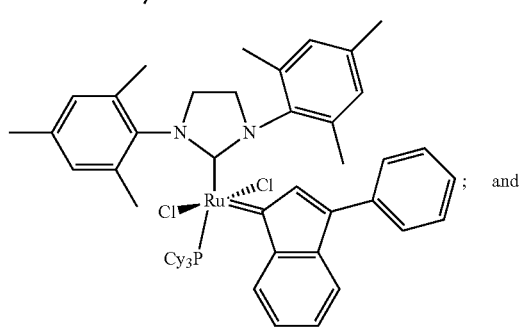

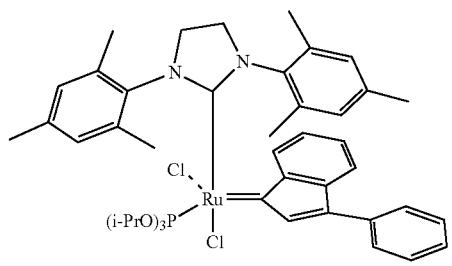

cis-[1,3-Bis(2,4,6-trimethylphenyl)-2-imidazolidinylidene]dichloro(3-phenyl-1H-inden-1-ylidene)(triisopropylphosphite)ruthenium(II).

12. The composition according to claim 1, which contains a compound of formula (V) selected from the group consisting of:

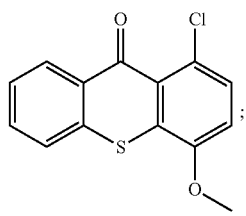

1-chloro-4-methoxy-9H-thioxanthen-9-one

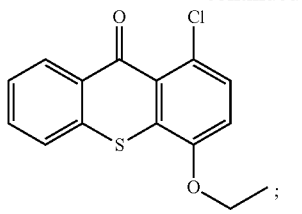

1-chloro-4-ethoxy-9H-
thioxanthen-9-one

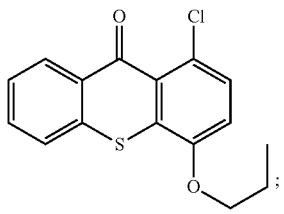

1-chloro-4-propoxy-9H-
thioxanthen-9-one

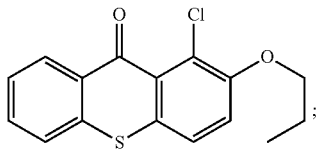

1-chloro-2-propoxy-9H-thioxanthen-
9-one

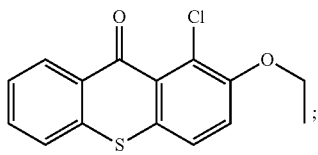

1-chloro-2-ethoxy-9H-thioxanthen-
9-one

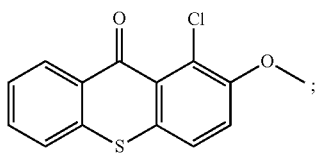

1-chloro-2-methoxy-9H-thioxanthen-
9-one

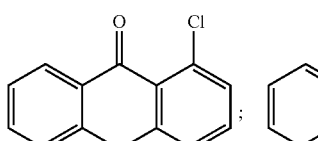 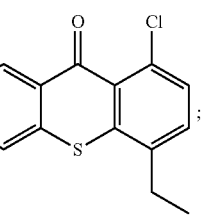

1-chloro-4-methyl-9H-
thioxanthen-9-one 1-chloro-4-ethyl-9H-
thioxanthen-9-one

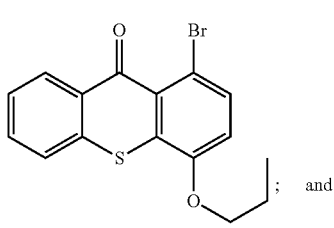 ; and 1-bromo-4-propoxy-9H-
thioxanthen-9-one

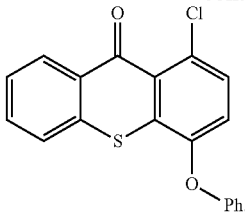

1-chloro-4-phenoxy-9H-
thioxanthen-9-one

13. The composition according to claim 1, which is selected from the group consisting of:
5-phenethylbicyclo[2.2.1]hept-2-ene (PEN B), 1,3-bis(2,4,6-trimethylphenylimidazolidin-2-ylidene)(tricyclohexylphosphine)-(2-oxobenzylidene)ruthenium(VI) iodide and 1-chloro-4-propoxy-9H-thioxanthen-9-one (CPTX);
5-phenethylbicyclo[2.2.1]hept-2-ene (PEN B), 1,3-bis(2,4,6-trimethylphenylimidazolidin-2-ylidene)(tricyclohexylphosphine)-(2-oxobenzylidene)ruthenium(VI) iodide, 1-chloro-4-propoxy-9H-thioxanthen-9-one (CPTX) and polystyrene;
5-phenethylbicyclo[2.2.1]hept-2-ene (PENB), 1,4-di(bicyclo[2.2.1]hept-5-en-2-yl)butane (NBBuNB), 1,3-bis(2,4,6-trimethylphenylimidazolidin-2-ylidene)(tricyclohexylphosphine)-(2-oxobenzylidene)ruthenium(VI) chloride and 1-chloro-4-propoxy-9H-thioxanthen-9-one (CPTX);
5-phenethylbicyclo[2.2.1]hept-2-ene (PENB), 1,2,3,4,4a,5,8,8a-octahydro-1,4:5,8-dimethanonaphthalene (TD), 1,3-bis(2,4,6-trimethylphenylimidazolidin-2-ylidene)(tricyclohexylphosphine)-(2-oxobenzylidene)ruthenium(VI) chloride and 1-chloro-4-propoxy-9H-thioxanthen-9-one (CPTX);
5-phenethylbicyclo[2.2.1]hept-2-ene (PENB), 1,2,3,4,4a,5,8,8a-octahydro-1,4:5,8-dimethanonaphthalene (TD), 3a,4,7,7a-tetrahydro-1H-4,7-methanoindene (DC PD), 1,3-bis(2,4,6-trimethylphenylimidazolidin-2-ylidene)(tricyclohexylphosphine)-(2-oxobenzylidene)ruthenium(VI) chloride and 1-chloro-4-propoxy-9H-thioxanthen-9-one (CPTX);
5-(2-([1,1'-biphenyl]-2-yloxy)ethyl)bicyclo[2.2.1]hept-2-ene (NBEtOPhPh), 1,3-bis(2,4,6-trimethylphenylimidazolidin-2-ylidene)(tricyclohexylphosphine)-(2-oxobenzylidene)ruthenium(VI) chloride and 1-chloro-4-propoxy-9H-thioxanthen-9-one (CPTX);
5-hexylbicyclo[2.2.1]hept-2-ene (HexylNB), 1,3-bis(2,4,6-trimethylphenyl-imidazolidin-2-ylidene)(tricyclohexylphosphine)-(2-oxobenzylidene)ruthenium(VI) chloride and 1-chloro-4-propoxy-9H-thioxanthen-9-one (CPTX);
5-decylbicyclo[2.2.1]hept-2-ene (DecylNB), 1,3-bis(2,4,6-trimethylphenyl-imidazolidin-2-ylidene)(tricyclohexylphosphine)-(2-oxobenzylidene)ruthenium(VI) chloride and 1-chloro-4-propoxy-9H-thioxanthen-9-one (CPTX);
5-butylbicyclo[2.2.1]hept-2-ene (BuNB), 3a,4,7,7a-tetrahydro-1H-4,7-methanoindene (DCPD), 1,3-bis(2,4,6-trimethylphenyl-imidazolidin-2-ylidene)(tricyclohexyl-phosphine)-(2-oxobenzylidene)ruthenium(VI) chloride and 1-chloro-4-propoxy-9H-thioxanthen-9-one (CPTX);
5-decylbicyclo[2.2.1]hept-2-ene (DecylNB), 3a,4,7,7a-tetrahydro-1H-4,7-methanoindene (DCPD), 1,3-bis(2, 4,6-trimethylphenyl-imidazolidin-2-ylidene)(tricyclo-hexyl-phosphine)-(2-oxobenzylidene)ruthenium(VI) chloride and 1-chloro-4-propoxy-9H-thioxanthen-9-one (CPTX); and 5-phenethylbicyclo[2.2.1]hept-2-ene (PENB), 5-(2-([1,1'-biphenyl]-4-yl)ethyl)bicyclo[2.2.1]hept-2-ene (NBEt-PhPh), 1,3-bis(2,4,6-trimethylphenylimidazolidin-2-ylidene)(tricyclohexylphosphine)-(2-oxobenzylidene) ruthenium(VI) chloride and 1-chloro-4-propoxy-9H-thioxanthen-9-one (CPTX).

14. A kit for forming a substantially transparent film comprising:

a) one or more monomers of formula (I):

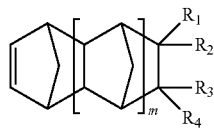

(I)

wherein:

m is an integer 0, 1 or 2;

$R_1$, $R_2$, $R_3$ and $R_4$ are the same or different and each independently selected from the group consisting of hydrogen, halogen, methyl, ethyl, linear or branched $(C_3$-$C_{16})$alkyl, perfluoro$(C_1$-$C_{12})$alkyl, hydroxy$(C_1$-$C_{16})$alkyl, $(C_3$-$C_{12})$cycloalkyl, $(C_6$-$C_{12})$bicycloalkyl, $(CH_2)_a$—$(C_6$-$C_{12})$bicycloalkenyl, $(C_7$-$C_{14})$tricycloalkyl, $(C_6$-$C_{10})$aryl, $(C_6$-$C_{10})$aryl$(C_1$-$C_6)$alkyl, perfluoro$(C_6$-$C_{10})$aryl, perfluoro$(C_6$-$C_{10})$aryl$(C_1$-$C_3)$alkyl, tri$(C_1$-$C_6)$alkoxysilyl and a group of formula (A):

—Z-Aryl (A)

wherein:

Z is a bond or a group selected from the group consisting of:

$(CR_5R_6)_a$, $O(CR_5R_6)_a$, $(CR_5R_6)_aO$, $(CR_5R_6)_a$—O—$(CR_5R_6)_b$, $(CR_5R_6)_b$, $(CR_5R_6)_a$—O—$(SiR_5R_6)_b$, $(CR_5R_6)_a$—$(CO)O$—$(CR_5R_6)_b$, $(CR_5R_6)_a$—$O(CO)$—$(CR_5R_6)_b$ and $(CR_5R_6)_a$—$(CO)$—$(CR_5R_6)_b$, where a and b are integers which may be the same or different and each independently is 1 to 12;

$R_5$ and $R_6$ are the same or different and each independently selected from the group consisting of hydrogen, methyl ethyl, linear or branched $(C_3$-$C_6)$alkyl, hydroxy, methoxy, ethoxy, linear or branched $(C_3$-$C_6)$alkyloxy, acetoxy, $(C_2$-$C_6)$acyl, hydroxymethyl, hydroxyethyl, linear or branched hydroxy$(C_3$-$C_6)$ alkyl, substituted or unsubstituted phenyl and substituted or unsubstituted phenoxy;

Aryl is phenyl or phenyl substituted with one or more of groups selected from the group consisting of methyl, ethyl, linear or branched $(C_3$-$C_6)$alkyl, hydroxy, methoxy, ethoxy, linear or branched $(C_3$-$C_6)$alkyloxy, acetoxy, $(C_2$-$C_6)$acyl, hydroxymethyl, hydroxyethyl, linear or branched hydroxy$(C_3$-$C_6)$alkyl, phenyl and phenoxy; or one of $R_1$ or $R_2$ taken together with one of $R_3$ or $R_4$ and the carbon atoms to which they are attached to form a $(C_5$-$C_7)$carbocyclic ring optionally containing one or more double bonds;

b) a latent organo-transition metal catalyst comprising a metal selected from the group consisting of ruthenium and osmium; and c) a compound of the formula (V):

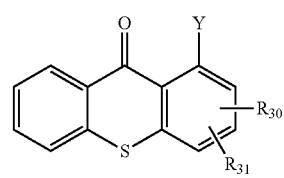

(V)

wherein

Y is halogen; and $R_{30}$ and $R_{31}$ are the same or different and independently of each other selected from the group consisting of hydrogen, methyl, ethyl, linear or branched $(C_3$-$C_{12})$alkyl, $(C_3$-$C_{12})$cycloalkyl, $(C_6$-$C_{12})$bicycloalkyl, $(C_7$-$C_{14})$tricycloalkyl, $(C_6$-$C_{10})$aryl, $(C_6$-$C_{10})$aryl$(C_1$-$C_3)$alkyl, $(C_1$-$C_{12})$alkoxy, $(C_3$-$C_{12})$cycloalkoxy, $(C_6$-$C_{12})$bicycloalkoxy, $(C_7$-$C_{14})$tricycloalkoxy, $(C_6$-$C_{10})$aryloxy $(C_1$-$C_3)$alkyl and $(C_6$-$C_{10})$-aryloxy.

15. The kit according to claim 14, which contains a compound of formula (V) selected from the group consisting of:

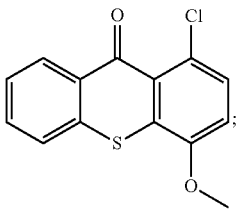

1-chloro-4-methoxy-9H-thioxanthen-9-one

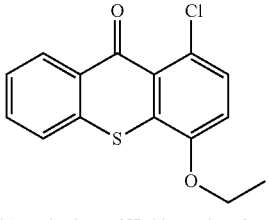

1-chloro-4-ethoxy-9H-thioxanthen-9-one

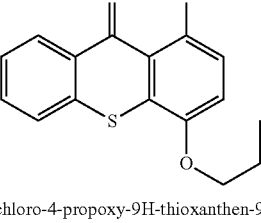

1-chloro-4-propoxy-9H-thioxanthen-9-one

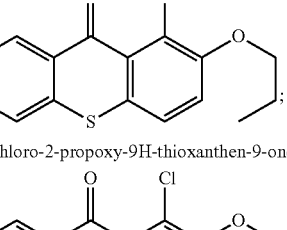

1-chloro-2-propoxy-9H-thioxanthen-9-one

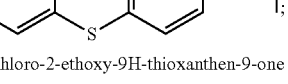

1-chloro-2-ethoxy-9H-thioxanthen-9-one

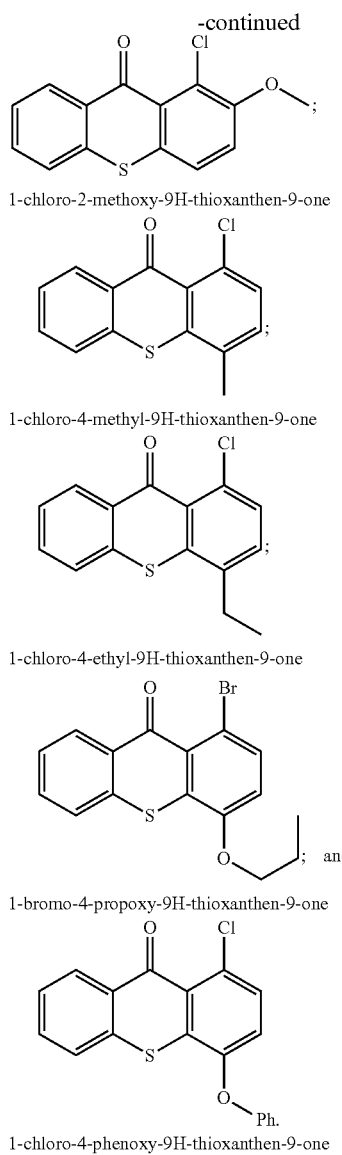

-continued 1-chloro-2-methoxy-9H-thioxanthen-9-one 1-chloro-4-methyl-9H-thioxanthen-9-one 1-chloro-4-ethyl-9H-thioxanthen-9-one 1-bromo-4-propoxy-9H-thioxanthen-9-one; and 1-chloro-4-phenoxy-9H-thioxanthen-9-one 16. The kit according to claim 14, which contains at least two monomers of formula (I) distinct from one another, wherein one monomer is completely soluble in the other monomer, and when said composition is exposed to radiation at 395 nm for a sufficient length of time it forms a substantially transparent film having at least 90 percent of visible light transmission.

17. The kit according to claim 14, which contains a mixture selected from the group consisting of:

5-phenethylbicyclo[2.2.1]hept-2-ene (PENB), 1,3-bis(2,4,6-trimethylphenylimidazolidin-2-ylidene)(tricyclohexylphosphine)-(2-oxobenzylidene)ruthenium(VI) iodide and 1-chloro-4-propoxy-9H-thioxanthen-9-one (CPTX);

5-phenethylbicyclo[2.2.1]hept-2-ene (PENB), 1,3-bis(2,4,6-trimethylphenylimidazolidin-2-ylidene)(tricyclohexylphosphine)-(2-oxobenzylidene)ruthenium(VI) iodide, 1-chloro-4-propoxy-9H-thioxanthen-9-one (CPTX) and polystyrene;

5-phenethylbicyclo[2.2.1]hept-2-ene (PENB), 1,4-di(bicyclo[2.2.1]hept-5-en-2-yl)butane (NBBuNB), 1,3-bis(2,4,6-trimethylphenylimidazolidin-2-ylidene)(tricyclohexylphosphine)-(2-oxobenzylidene)ruthenium(VI) chloride and 1-chloro-4-propoxy-9H-thioxanthen-9-one (CPTX);

5-phenethylbicyclo[2.2.1]hept-2-ene (PENB), 1,2,3,4,4a,5,8,8a-octahydro-1,4:5,8-dimethanonaphthalene (TD), 1,3-bis(2,4,6-trimethylphenylimidazolidin-2-ylidene)(tricyclohexylphosphine)-(2-oxobenzylidene)ruthenium(VI) chloride and 1-chloro-4-propoxy-9H-thioxanthen-9-one (CPTX);

5-phenethylbicyclo[2.2.1]hept-2-ene (PENB), 1,2,3,4,4a,5,8,8a-octahydro-1,4:5, 8-dimethanonaphthalene (TD), 3a,4,7,7a-tetrahydro-1H-4,7-methanoindene (DCPD), 1,3-bis(2,4,6-trimethylphenylimidazolidin-2-ylidene)(tricyclohexylphosphine)-(2-oxobenzylidene)ruthenium(VI) chloride and 1-chloro-4-propoxy-9H-thioxanthen-9-one (CPTX);

5-(2-([1,1'-biphenyl]-2-yloxy)ethyl)bicyclo[2.2.1]hept-2-ene (NBEtOPhPh), 1,3-bis(2,4,6-trimethylphenylimidazolidin-2-ylidene)(tricyclohexylphosphine)-(2-oxobenzylidene)ruthenium(VI) chloride and 1-chloro-4-propoxy-9H-thioxanthen-9-one (CPTX);

5-hexylbicyclo[2.2.1]hept-2-ene (HexylNB), 1,3-bis(2,4,6-trimethylphenyl-imidazolidin-2-ylidene)(tricyclohexylphosphine)-(2-oxobenzylidene)ruthenium(VI) chloride and 1-chloro-4-propoxy-9H-thioxanthen-9-one (CPTX);

5-decylbicyclo[2.2.1]hept-2-ene (DecylNB), 1,3-bis(2,4,6-trimethylphenyl-imidazolidin-2-ylidene)(tricyclohexylphosphine)-(2-oxobenzylidene)ruthenium(VI) chloride and 1-chloro-4-propoxy-9H-thioxanthen-9-one (CPTX);

5-butylbicyclo[2.2.1]hept-2-ene (BuNB), 3a,4,7,7a-tetrahydro-1H-4,7-methanoindene (DCPD), 1,3-bis(2,46-trimethylphenyl-imidazolidin-2-ylidene)(tricyclohexyl-phosphine)-(2-oxobenzylidene)ruthenium(VI) chloride and 1-chloro-4-propoxy-9H-thioxanthen-9-one (CPTX);

5-decylbicyclo[2.2.1]hept-2-ene (DecylNB), 3a,4,7,7a-tetrahydro-1H-4,7-methanoindene (DCPD), 1,3-bis(2,4,6-trimethylphenyl-imidazolidin-2-ylidene)(tricyclohexyl-phosphine)-(2-oxobenzylidene)ruthenium(VI) chloride and 1-chloro-4-propoxy-9H-thioxanthen-9-one (CPTX); and 5-phenethylbicyclo[2.2.1]hept-2-ene (PENB), 5-(2-([1,1'-biphenyl]-4-yl)ethyl)bicyclo[2.2.1]hept-2-ene (NBEtPhPh), 1,3-bis(2,4,6-trimethylphenyl imidazolidin-2-ylidene)(tricyclohexylphosphine)-(2-oxobenzylidene) ruthenium(VI) chloride and 1-chloro-4-propoxy-9H-thioxanthen-9-one (CPTX).

18. A film comprising the composition of claim 1.
19. A film comprising the composition of claim 13.

* * * * *

UNITED STATES PATENT AND TRADEMARK OFFICE
CERTIFICATE OF CORRECTION

PATENT NO. : 10,675,614 B2
APPLICATION NO. : 16/257137
DATED : June 9, 2020
INVENTOR(S) : Oleksandr Burtovyy It is certified that error appears in the above-identified patent and that said Letters Patent is hereby corrected as shown below:

In the Specification

In Column 13, Line 30, delete " 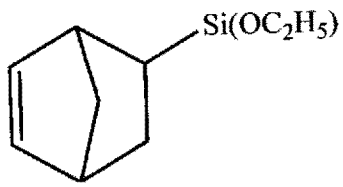 " and insert therefor 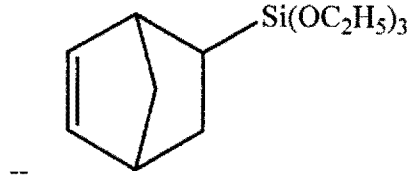 --.

In Column 18, Lines 1-2, delete "R8 is hydrogen, NO2 or C1" and insert therefor -- R8 is hydrogen, NO2 or Cl --.

In Column 28, within Table 1, delete the first line of caption of Column 3, "Ru-II" and insert therefor -- Ru-I --.

In the Claims

In Claim 1, Column 29, Line 9, delete "an one or more monomers of formula (I):" and insert therefor -- a) one or more monomers of formula (I): --.

In Claim 6, Column 32, Line 10, delete the caption of right structure, "(NB(MeOH)2" and insert therefor -- NB(MeOH)2 --.

In Claim 7, Column 32, Line 45, delete "a compound of formula (HIA)" and insert therefor Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*

-- a compound of formula (IIA) --.

In Claim 7, Column 33, Line 44, delete "-N-CHC(O)O(C1-C6)alkyl" and insert therefor
-- -N=CHC(O)O(C1-C6)alkyl --.

In Claim 7, Column 33, Line 56, delete "tert butyl substituted" and insert therefor -- tert butyl, substituted --.

In Claim 8, Column 35, Line 55, delete "an R8 or Cl" and insert therefor -- and R8 is NO2 or Cl --.

In Claim 10, Column 38, Line 20, delete " 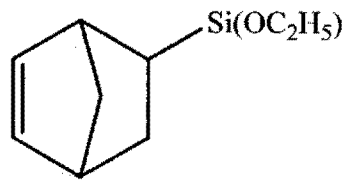 " and insert therefor
-- 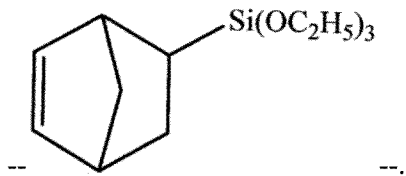 --.

In Claim 11, Column 39, Line 18, delete "1,3-bis(2,4,6-trimethylphenylimidazolidin-2-ylidene)(tricyclohexylphosphine)-(2-oxobenzylidene)ruthenium iodide" and insert therefor -- 1,3-bis(2,4,6-trimethylphenylimidazolidin-2-ylidene)(tricyclohexylphosphine)-(2-oxobenzylidene)ruthenium(VI) iodide --.

In Claim 13, Column 42, Line 40, delete "DC PD" and insert therefor -- DCPD --.

In Claim 14, Column 44, Line 21, delete "(C6-C10)-aryloxy" and insert therefor
-- (C6-C10)aryloxy --.